United States Patent
Kitami et al.

(10) Patent No.: US 8,676,517 B2
(45) Date of Patent: Mar. 18, 2014

(54) SIGNAL PROCESSING METHOD, SIGNAL PROCESSING APPARATUS, AND CORIOLIS FLOWMETER

(75) Inventors: Hirokazu Kitami, Tokyo (JP); Hideki Shimada, Tokyo (JP)

(73) Assignee: Oval Corporation, Tokyo (JP)

( * ) Notice: Subject to any disclaimer, the term of this patent is extended or adjusted under 35 U.S.C. 154(b) by 591 days.

(21) Appl. No.: 12/921,456

(22) PCT Filed: Jun. 10, 2009

(86) PCT No.: PCT/JP2009/060970
§ 371 (c)(1),
(2), (4) Date: Oct. 5, 2010

(87) PCT Pub. No.: WO2010/089906
PCT Pub. Date: Aug. 12, 2010

(65) Prior Publication Data
US 2011/0016989 A1    Jan. 27, 2011

(30) Foreign Application Priority Data
Feb. 6, 2009    (JP) .................................. 2009-025715

(51) Int. Cl.
*G01F 1/00*    (2006.01)
*G01F 1/80*    (2006.01)
(52) U.S. Cl.
USPC ........................................ 702/45; 73/861.356
(58) Field of Classification Search
USPC ............. 702/45; 73/861.18, 861.19, 861.351, 73/861.354
See application file for complete search history.

(56) References Cited

U.S. PATENT DOCUMENTS

| 6,513,392 B1 * | 2/2003 | Barger et al. ............ 73/861.356 |
| 2005/0140522 A1 | 6/2005 | Heilig et al. |
| 2007/0006666 A1 | 1/2007 | Henry |
| 2007/0124090 A1 * | 5/2007 | Henry et al. .................... 702/45 |
| 2008/0053240 A1 * | 3/2008 | Henry et al. ............. 73/861.04 |
| 2008/0252283 A1 | 10/2008 | McAnally et al. |

FOREIGN PATENT DOCUMENTS

| DE | 10161071 | 6/2003 |
| WO | 2007/008958 | 1/2007 |
| WO | 2007/047524 | 4/2007 |

OTHER PUBLICATIONS

International Search Report issued Sep. 15, 2009 in International (PCT) Application No. PCT/JP2009/060970.

* cited by examiner

*Primary Examiner* — Jonathan C Teixeira Moffat
*Assistant Examiner* — Regis Betsch
(74) *Attorney, Agent, or Firm* — Wenderoth, Lind & Ponack, L.L.P.

(57) ABSTRACT

A signal processing method for a Coriolis flowmeter including: performing frequency conversion of a first digital signal, the frequency conversion performed on the first digital signal modulating the frequency of the first digital signal so that the frequency of the first digital signal after the frequency conversion is 1/Nth of the frequency of the first digital signal before the frequency conversion, where N is an integer; performing frequency conversion of a second digital signal, the frequency conversion performed on the second digital signal modulating the frequency of the second digital signal so that the frequency of the second digital signal after the frequency conversion is 1/Nth of the frequency of the second digital signal before the frequency conversion; and measuring a phase difference between (i) the frequency converted first digital signal and (ii) the frequency converted second digital signal.

6 Claims, 14 Drawing Sheets

FIG. 7
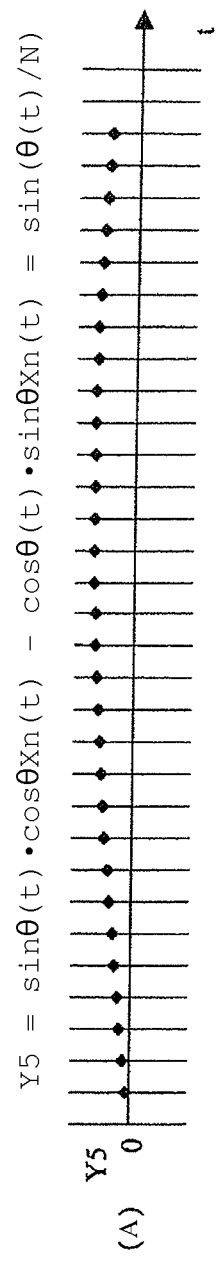
(A)
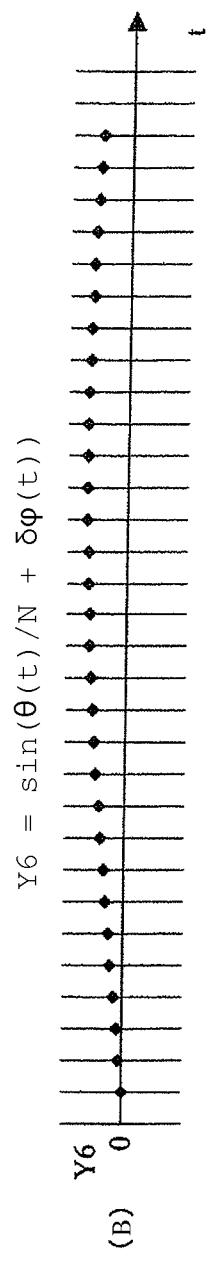
(B)
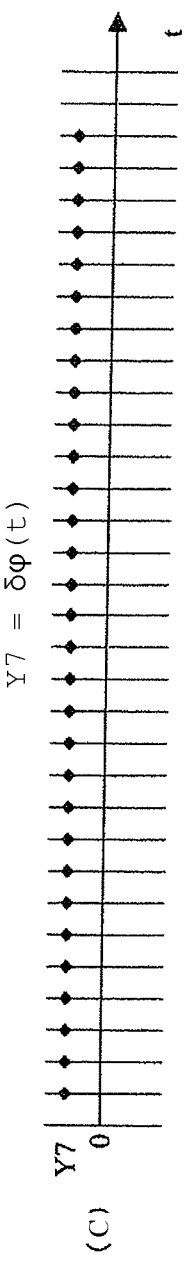
(C)

SIGNAL PROCESSING METHOD, SIGNAL PROCESSING APPARATUS, AND CORIOLIS FLOWMETER

TECHNICAL FIELD

The present invention relates to a Coriolis flowmeter for detecting a phase difference and/or a vibration frequency proportional to a Coriolis force acting on a flow tube to obtain a mass flow rate and/or density of a fluid to be measured.

BACKGROUND ART

A Coriolis flowmeter is a mass flowmeter based on a point that a Coriolis force acting on a flow tube (hereinafter, flow tube to be vibrated is referred to as flow tube) is proportional to a mass flow rate in a case where the flow tube through which a fluid to be measured flows is supported at both ends and vibration is applied about a support point in a direction perpendicular to a flow direction of the flow tube. The Coriolis flowmeter is well known and a shape of a flow tube in the Coriolis flowmeter is broadly divided into a straight-tube type and a curved-tube-type.

The Coriolis flowmeter is a mass flowmeter for detecting a phase difference signal proportional to a mass flow rate in symmetrical positions between both end support portions and central portion of a measurement tube in a case where the measurement tube through which a fluid to be measured flows is supported at both ends and the central portion of the supported measurement tube is alternately driven in a direction perpendicular to a support line. The phase difference signal is the quantity proportional to the mass flow rate. When a driving frequency is maintained constant, the phase difference signal may be detected as a time difference signal in the observation positions of the measurement tube.

When the alternate driving frequency of the measurement tube is made equal to the natural frequency of the measurement tube, a constant driving frequency corresponding to a density of the fluid to be measured is obtained, and hence the measurement tube may be driven with small driving energy. Therefore, recently, the measurement tube is generally driven at the natural frequency and the phase difference signal is detected as the time difference signal.

The straight-tube type Coriolis flowmeter has a structure in which, in a case where vibration is applied in a direction perpendicular to a straight tube axis of a central portion of a straight tube supported at both ends, a displacement difference of the straight tube which is caused by a Coriolis force, that is, a phase difference signal is obtained between the support portion and central portion of the straight tube, and a mass flow rate is detected based on the phase difference signal. The straight-tube type Coriolis flowmeter as described above has a simple, compact, and tough structure. However, the Coriolis flowmeter also has a problem that high detection sensitivity cannot be obtained.

In contrast to this, the curved-tube-type Coriolis flowmeter is superior to the straight-tube type Coriolis flowmeter in the point that a shape for effectively taking out the Coriolis force may be selected. The mass flow rate may be actually detected with high sensitivity.

A combination of a coil and a magnet are generally used as driving means for driving the flow tube. The coil and the magnet are preferably attached to positions which are not offset in the vibration direction of the flow tube because a positional relationship deviation between the coil and the magnet is minimized. Therefore, in a case of a curved-tube-type Coriolis flowmeter including two parallel flow tubes, the two parallel flow tubes are attached so as to sandwich the coil and the magnet. Therefore, a design is made so that the two opposed flow tubes are separated from each other at an interval to sandwich at least the coil and the magnet.

Of Coriolis flowmeters including two flow tubes located in parallel planes, a Coriolis flowmeter having a large diameter or a Coriolis flowmeter having high flow tube rigidity is required to increase power of driving means, and hence it is necessary to sandwich large driving means between the two flow tubes. Therefore, a design is made so that an interval between the flow tubes is necessarily widened even in a fixed end portion which is a base portion of the flow tubes.

As illustrated in FIG. 10, a Coriolis flowmeter 1 which is generally known and includes U-shaped measurement tubes includes a detector 4 for two U-shaped measurement tubes 2 and 3, and a converter 5.

The detector 4 for the measurement tubes 2 and 3 includes a vibrator 6 for resonance-vibrating the measurement tubes 2 and 3, a left velocity sensor 7 for detecting a vibration velocity generated on a left side of the measurement tubes 2 and 3 vibrated by the vibrator 6, a right velocity sensor 8 for detecting a vibration velocity generated on a right side of the measurement tubes 2 and 3 vibrated by the vibrator 6, and a temperature sensor 9 for detecting a temperature of a fluid to be measured, which flows through the measurement tubes 2 and 3 at the detection of the vibration velocity. The vibrator 6, the left velocity sensor 7, the right velocity sensor 8, and the temperature sensor 9 are connected to the converter 5.

The fluid to be measured, which flows through the measurement tubes 2 and 3 of the Coriolis flowmeter 1, flows from the right side of the measurement tubes 2 and 3 (side on which right velocity sensor 8 is provided) to the left side thereof (side on which left velocity sensor 7 is provided).

Therefore, a velocity signal detected by the right velocity sensor 8 is an inlet-side velocity signal of the fluid to be measured flowing into the measurement tubes 2 and 3. A velocity signal detected by the left velocity sensor 7 is an outlet-side velocity signal of the fluid to be measured flowing from the measurement tubes 2 and 3.

Each of the left velocity sensor 7 and the right velocity sensor 8 which detect the vibration velocities may be an acceleration sensor.

The converter 5 of the Coriolis flowmeter has a block structure as illustrated in FIG. 11.

The converter 5 of the Coriolis flowmeter includes a drive control section 10, a phase measurement section 11, and a temperature measurement section 12.

That is, the converter 5 of the Coriolis flowmeter has an input and output port 15. A drive signal output terminal 16 included in the drive control section 10 is provided in the input and output port 15. The drive control section 10 outputs a predetermined mode signal, from the drive signal output terminal 16 to the vibrator 6 attached to the measurement tubes 2 and 3 to resonance-vibrate the measurement tubes 2 and 3.

The drive signal output terminal 16 is connected to a drive circuit 18 through an amplifier 17. The drive circuit generates a drive signal for resonance-vibrating the measurement tubes 2 and 3 and outputs the drive signal to the amplifier 17. The amplifier amplifies the input drive signal and outputs the drive signal to the drive signal output terminal 16. The drive signal output from the amplifier 17 is output from the drive signal output terminal 16 to the vibrator 6.

A left velocity signal input terminal 19 to which a detection signal of the vibration velocity generated on the left side of the measurement tubes 2 and 3 vibrated by the vibrator 6 is input is provided in the input and output port 15. The left velocity signal input terminal 19 is included in the phase measurement section 11.

A right velocity signal input terminal 20 to which a detection signal of the vibration velocity generated on the right side of the measurement tubes 2 and 3 vibrated by the vibrator 6 is input is provided in the input and output port 15. The right velocity signal input terminal 20 is included in the phase measurement section 11.

The phase measurement section 11 performs A/D conversion on the vibration signals of the pair of velocity sensors in the case where the predetermined mode signal is output from the drive signal output terminal 16 to the vibrator 6 attached to the measurement tubes 2 and 3 to vibrate the measurement tubes 2 and 3 by the vibrator 6, to thereby perform digital conversion processing, and then obtains a phase difference between the converted signals.

The left velocity signal input terminal 19 is connected to an input terminal of an amplifier 21. An output terminal of the amplifier 21 is connected to an A/D converter 22. The A/D converter 22 converts, into a digital value, an analog signal obtained by amplifying the vibration signal output from the left velocity signal input terminal 19 by the amplifier 21.

The A/D converter 22 is connected to a computing device 23.

Further, the right velocity signal input terminal 20 is connected to an input terminal of an amplifier 24. An output terminal of the amplifier 24 is connected to an A/D converter 25. The A/D converter 25 converts, into a digital value, an analog signal obtained by amplifying the vibration signal output from the right velocity signal input terminal 20 by the amplifier 24.

Further, the digital signal output from the A/D converter 25 is input to the computing device 23.

Further, a temperature signal input terminal 26 included in the temperature measurement section 11 to which a detection value from the temperature sensor 9 is input is provided in the input and output port 15. The temperature measurement section 12 performs tube temperature compensation based on the detection temperature obtained by the temperature sensor 9 which is provided in the measurement tubes 2 and 3 and detects an internal temperature of the measurement tubes 2 and 3.

A resistance type temperature sensor is generally used as the temperature sensor 9 to measure a resistance value, to thereby calculate a temperature.

The temperature signal input terminal 26 is connected to a temperature measurement circuit 27. The temperature measurement circuit 27 calculates the internal temperature of the measurement tubes 2 and 3 based on the resistance value output from the temperature sensor 9. The internal temperature of the measurement tubes 2 and 3 which is calculated by the temperature measurement circuit 27 is input to the computing device 23.

In the phase measurement method using the Coriolis flowmeter 1 as described above, vibration is applied in a primary mode, to the measurement tubes 2 and 3, from the vibrator 6 attached to the measurement tubes 2 and 3. When the fluid to be measured flows into the measurement tubes 2 and 3 while the vibration is applied, a phase mode is produced in the measurement tubes 2 and 3.

Therefore, the signal (inlet-side velocity signal) from the right velocity sensor 8 and the signal (outlet-side velocity signal) from the left velocity sensor 7 in the Coriolis flowmeter 1 are output as a form in which the two signals are superimposed on each other. A signal output as the form in which the two signals are superimposed on each other includes not only a flow rate signal but also a large number of unnecessary noise components. In addition, a frequency is changed depending on, for example, a change in density of the fluid to be measured.

Therefore, it is necessary to remove an unnecessary signal from the signals from the right velocity sensor 8 and the left velocity sensor 7. However, it is very difficult to remove the unnecessary signal from the signals from the right velocity sensor 8 and the left velocity sensor 7 to calculate the phase.

Further, the Coriolis flowmeter 1 is often required to have very-high-precision measurement and high-speed response. In order to satisfy such requirements, a computing device having very-complex computation and high-processing performance is necessary, and hence the Coriolis flowmeter 1 itself is very expensive.

Thus, the Coriolis flowmeter 1 requires an established phase difference measurement method using both an optimum filter always fit to a measurement frequency and a high-speed computing method.

In conventional phase difference measurement methods of calculating a flow rate, a filter processing method of removing noise is divided into a method using an analog filter and a method using a digital filter.

The method using the analog filter may be relatively inexpensive (see, for example, JP 02-66410 A and JP 10-503017 A). However, JP 02-66410 A and JP 10-503017 A have a limit to improve the performance of the filter, and hence, there is a problem that the filter is not sufficient for the Coriolis flowmeter.

In recent years, a large number of Coriolis flowmeters using digital signal processing have been developed, and the method using the digital filter has been developed as the filter processing method of removing noise in the conventional phase difference measurement methods of calculating the flow rate.

Examples of conventional types of the Coriolis flowmeters using digital signal processing include a method of measuring a phase using a Fourier transform (see, for example, JP 2799243 B) and a method of selecting an optimum table fit to an input frequency from filter tables including a notch filter and a band-pass filter to measure a phase (see, for example, JP 2930430 B and JP 3219122 B).

<<Phase Measurement Method using Fourier Transform>>

A converter of the Coriolis flowmeter based on the phase measurement method using the Fourier transform has a block structure as illustrated in FIG. 12.

In FIG. 12, the left velocity signal input terminal 19 provided in the input and output port 15 to which the detection signal of the vibration velocity (outlet-side velocity signal) which is generated on the left side of the measurement tubes 2 and 3 vibrated by the vibrator 6 and which is detected by the left velocity sensor 7 is input is connected to a low-pass filter 30. The low-pass filter 30 is a circuit for extracting, through a frequency filter, only a low-frequency left velocity signal (outlet-side velocity signal) from the left velocity signal (outlet-side velocity signal) output from the left velocity sensor 7 detecting the vibration velocity generated on the left side of the measurement tubes 2 and 3 in the case where the measurement tubes 2 and 3 are vibrated by the vibrator 6.

The low-pass filter 30 is connected to an A/D converter 31. The A/D converter 31 converts, into a digital signal, the left velocity signal which is the analog signal output from the low-pass filter 30. The left velocity signal obtained as the digital signal by conversion by the A/D converter 31 is input to a phase difference measurement unit 32.

The A/D converter 31 is connected to a timing generator 33. The timing generator 33 generates a timing of sampling M-times (M is natural number) the input frequency.

On the other hand, the right velocity signal input terminal 20 provided in the input and output port 15 to which the detection signal of the vibration velocity (inlet-side velocity signal) which is generated on the right side of the measurement tubes 2 and 3 vibrated by the vibrator 6 and which is detected by the right velocity sensor 8 is input is connected to a low-pass filter 34. The low-pass filter 34 is a circuit for extracting, through a frequency filter, only a low-frequency right velocity signal (inlet-side velocity signal) from the right velocity signal (inlet-side velocity signal) output from the right velocity sensor 8 detecting the vibration velocity generated on the right side of the measurement tubes 2 and 3 in the case where the measurement tubes 2 and 3 are vibrated by the vibrator 6.

The low-pass filter 34 is connected to an A/D converter 35. The A/D converter 35 converts, into a digital signal, the right velocity signal which is the analog signal output from the low-pass filter 34. The right velocity signal obtained as the digital signal by conversion by the A/D converter 35 is input to the phase difference measurement unit 32.

Further, the A/D converter 35 is connected to the timing generator 33. The timing generator 33 generates a timing of sampling M-times (M is natural number) the input frequency.

Further, the right velocity signal input terminal 20 provided in the input and output port 15 to which the detection signal of the vibration velocity (inlet-side velocity signal) which is generated on the right side of the measurement tubes 2 and 3 vibrated by the vibrator 6 and which is detected by the right velocity sensor 8 is input is connected to a frequency measurement unit 36. The frequency measurement unit 36 measures the frequency of the detection signal of the vibration velocity (inlet-side velocity signal) which is generated on the right side of the measurement tubes 2 and 3 vibrated by the vibrator 6 and which is detected by the right velocity sensor 8.

The frequency measurement unit 36 is connected to the timing generator 33. The frequency measured by the frequency measurement unit 36 is output to the timing generator 33. The timing of sampling M-times (M is natural number) the input frequency is generated by the timing generator 33 and output to the A/D converters 31 and 35.

The phase difference measurement unit 32, the timing generator 33, and the frequency measurement unit 36 are included in a phase measurement computing device 40.

In the phase measurement method using the Fourier transform as illustrated in FIG. 12, the input signal (inlet-side velocity signal) from the right velocity sensor 8 is first input to the frequency measurement unit 36 to measure a frequency. The frequency measured by the frequency measurement unit 36 is input to the timing generator 33. The timing of sampling M-times (M is natural number) the input frequency is generated by the timing generator 33 and input to the A/D converters 31 and 35.

Further, the detection signal of the vibration velocity (outlet-side velocity signal) which is generated on the left side of the measurement tubes 2 and 3 and obtained as the digital signal by conversion by the A/D converter 31 and the detection signal of the vibration velocity (inlet-side velocity signal) which is generated on the right side of the measurement tubes 2 and 3 and obtained as the digital signal by conversion by the A/D converter 35 are input to the phase difference measurement unit 32. The detection signals are Fourier-transformed by a discrete Fourier transform unit incorporated in the phase difference measurement unit 32 and a phase difference is computed based on a ratio between a real component and imaginary component of the converted signals.

<<Phase Measurement Method using Digital Filter>>

Converters of the Coriolis flowmeter based on the phase measurement method using the digital filter are described with reference to block structural diagrams illustrated in FIGS. 13 and 14.

Frequency selection means such as a notch filter or a band-pass filter is used as the digital filter. An S/N ratio of an input signal is improved using the frequency selection means such as the notch filter or the band-pass filter.

FIG. 13 illustrates a block structure of a converter of the Coriolis flowmeter using the notch filter as the digital filter.

The input and output port 15, the left velocity signal input terminal 19, the right velocity signal input terminal 20, the low-pass filters 30 and 34, and the A/D converters 31 and 35 as illustrated in FIG. 13 have the same structures as the input and output port 15, the left velocity signal input terminal 19, the right velocity signal input terminal 20, the low-pass filters 30 and 34, and the A/D converters 31 and 35 as illustrated in FIG. 12, respectively.

In FIG. 13, the A/D converter 31 is connected to a notch filter 51. The notch filter 51 selects a frequency based on the left velocity signal which is obtained as the digital signal by conversion by the A/D converter 31, so as to improve an S/N ratio of an input signal to be output.

The notch filter 51 is connected to a phase measurement unit 52. The phase measurement unit 52 measures a phase of the left velocity signal which is obtained as the digital signal by conversion and which is improved in S/N ratio by the notch filter 51.

Further, the notch filter 51 is connected to a frequency measurement unit 53. The frequency measurement unit 53 measures a frequency of the left velocity signal which is obtained as the digital signal by conversion and which is improved in S/N ratio by the notch filter 51.

The frequency measured by the frequency measurement unit 53 is input to the notch filter 51.

Further, the A/D converter 35 is connected to a notch filter 54. The notch filter 54 selects a frequency based on the left velocity signal which is obtained as the digital signal by conversion by the A/D converter 31, so as to improve an S/N ratio of an input signal to be output.

The notch filter 54 is connected to the phase measurement unit 52. The phase measurement unit 52 measures a phase of the right velocity signal which is obtained as the digital signal by conversion and which is improved in S/N ratio by the notch filter 54.

Further, the frequency measured by the frequency measurement unit 53 is input to the notch filter 54.

In FIG. 13, a clock 55 is used for synchronization, and input to the A/D converters 31 and 35 to synchronize the A/D converter 31 and the A/D converter 35 with each other.

The notch filters 51 and 54, the phase measurement unit 52, the frequency measurement unit 53, and the clock 55 are included in a phase measurement computing device 50.

FIG. 14 illustrates a block structure of a converter of the Coriolis flowmeter using the band-pass filter (BPF) as the digital filter.

The input and output port 15, the left velocity signal input terminal 19, the right velocity signal input terminal 20, the low-pass filters 30 and 34, and the A/D converters 31 and 35 as illustrated in FIG. 14 have the same structures as the input and output port 15, the left velocity signal input terminal 19, the right velocity signal input terminal 20, the low-pass filters 30 and 34, and the A/D converters 31 and 35 as illustrated in FIG. 13, respectively.

In FIG. 14, the A/D converter 31 is connected to a band-pass filter (BPF) 61. The band-pass filter 61 is a circuit for extracting, through a frequency filter, only a left velocity signal having a set frequency (outlet-side velocity signal) from the left velocity signal (outlet-side velocity signal) which is output from the left velocity sensor 7 detecting the vibration velocity generated on the left side of the measurement tubes 2 and 3 and which is obtained as the digital signal by conversion by the A/D converter 31 in the case where the measurement tubes 2 and 3 are vibrated by the vibrator 6.

The band-pass filter 61 is connected to a phase measurement unit 62. The phase measurement unit 62 measures a phase of the left velocity signal which is obtained as the digital signal by conversion and which is improved in S/N ratio by the band-pass filter 61.

Further, the band-pass filter 61 is connected to a frequency measurement unit 63. The frequency measurement unit 63 measures a frequency of the left velocity signal which is obtained as the digital signal by conversion by the A/D converter 31 and which is improved in S/N ratio by the band-pass filter 61.

The frequency measured by the frequency measurement unit 63 is input to the band-pass filter 61.

Further, the A/D converter 35 is connected to a band-pass filter 64. The band-pass filter 64 is a circuit for extracting, through a frequency filter, only a right velocity signal having a set frequency (inlet-side velocity signal) from the right velocity signal (inlet-side velocity signal) which is output from the right velocity sensor 8 detecting the vibration velocity generated on the right side of the measurement tubes 2 and 3 and which is obtained as the digital signal by conversion by the A/D converter 35 in the case where the measurement tubes 2 and 3 are vibrated by the vibrator 6.

The band-pass filter 64 is connected to the phase measurement unit 62. The phase measurement unit 62 measures a phase of the left velocity signal which is obtained as the digital signal by conversion and which is improved in S/N ratio by the band-pass filter 64.

The band-pass filter 64 is connected to the frequency measurement unit 63. The frequency measured by the frequency measurement unit 63 is input to the band-pass filter 64.

In FIG. 14, a clock 65 is used for synchronization, and a clock signal from the clock 65 is input to the A/D converters 31 and 35 to synchronize the A/D converter 31 and the A/D converter 35 with each other.

The band-pass filters 61 and 64, the phase measurement unit 62, the frequency measurement unit 63, and the clock 65 are included in a phase measurement computing device 60.

In the phase measurement method using the Fourier transform as described in JP 2799243 B, when the input frequency of the input detection signal of the vibration velocity is constant, a phase measurement method having very-high-frequency selectivity may be performed because the Fourier transform is used for frequency selection.

However, in the method using the Fourier transform as described in JP 2799243 B, when the input frequency of the input detection signal of the vibration velocity is changed according to a density or a temperature, it is necessary to change the transform method or the sampling rate. Therefore, the computing cycle or the computing method is changed, and hence a measurement value is varied and thus unstabilized.

In addition, in the method using the Fourier transform as described in JP 2799243 B, when the input frequency of the input detection signal of the vibration velocity is changed according to the density or the temperature, it is necessary to accurately synchronize the sampling rate with the input frequency of the input vibration velocity signal, and hence a design is very complicated.

Therefore, there is a problem that, when the temperature of the fluid to be measured is rapidly changed or the density is rapidly changed by mixing air bubbles into the fluid, the measurement precision is extremely reduced.

Further, the method using the Fourier transform as described in JP 2799243 B has a problem that the number of computing processings becomes very large because of the execution of the Fourier transform.

In the methods of selecting the optimum table fit to the input frequency from the filter tables including the notch filter and the band-pass filter to measure the phase as described in JP 2930430 B and JP 3219122 B, when the sampling rate is held, the design may be simplified.

However, as in the method using the Fourier transform as described in JP 2799243 B, the phase measurement methods using the digital filter as described in JP 2930430 B and JP 3219122 B require a very large number of filter tables corresponding to changed input frequencies, and hence have a problem that memory consumption of a computing device is large.

In addition, the phase measurement methods using the digital filter as described in JP 2930430 B and JP 3219122 B have a problem that it is difficult to select the optimum filter in a case where the input frequency rapidly changes.

Further, the phase measurement methods using the digital filter as described in JP 2930430 B and JP 3219122 B have a problem that a very large number of computations is required to improve frequency selection performance.

The phase measurement methods using the digital filter as described in JP 2930430 B and JP 3219122 B have the following problems.

(1) The method cannot follow the change in input frequency at high precision. That is, it is very difficult to realize measurement in a case where the density of the fluid to be measured rapidly changes because of air bubble mixing.

(2) In order to improve the frequency selection performance, a very large number of computations are required. Therefore, it is difficult to realize high-speed response, and hence the method is unsuitable for batch processing for a short period of time.

(3) The memory consumption of the computing device is large, and hence the design is complicated. Therefore, a circuit structure and design are complicated and very disadvantageous in cost.

When all the factors are considered, in any of the conventional phase measurement methods including the digital filter processing, a noise of a frequency band other than the tube frequencies of the measurement tubes 2 and 3 is removed, and hence the switching of the filter table, the change of the computing method, and the change of the sampling rate are required to always follow the tube frequencies of the measurement tubes 2 and 3. Therefore, there is a problem that it is necessary to perform computation which is very complicated and lacks high-speed performance.

Thus, when the measurement tubes 2 and 3 are vibrated by the vibrator 6, it is very likely to generate a computing error in each variation of the input frequencies of the vibration velocity signals which are detected by the right velocity sensor 8 for detecting the vibration velocity generated on the right side of the measurement tubes 2 and 3 and the left velocity sensor 7 for detecting the vibration velocity generated on the left side of the measurement tubes 2 and 3, and hence there is a problem that measurement precision is very low.

SUMMARY OF THE INVENTION

An object of the present invention is to provide a signal processing method, a signal processing apparatus, and a Coriolis flowmeter, in which even when a temperature of a fluid to be measured changes, even when air bubbles are mixed into the fluid to be measured, or even when the fluid to be measured rapidly changes from a gas to a liquid, measurement may be always performed with constant precision, phase measurement with high filtering performance is realized, and a computing processing amount may be reduced to an extremely small amount.

The measurement tube of the Coriolis flowmeter has various shapes. For example, there are a curved tube and a straight tube. There is a type driven in any of various modes including a primary mode and a secondary mode, as a mode for driving the measurement tube.

As is well known, the driving frequency band obtained from the measurement tube is several ten Hz to several kHz. For example, when the measurement tube using a U-shaped tube is vibrated in the primary mode, the frequency is approximately 100 Hz. When the measurement tube having a straight shape is vibrated in the primary mode, approximately 500 Hz to 1,000 Hz is realized.

However, it is very difficult to perform the phase measurement of the Coriolis flowmeter by always the same processing over the frequency band of several ten Hz to several kHz in a single flowmeter converter. Therefore, it is necessary to separately design several types.

According to the signal processing method in the present invention, the essential problems as described above may be removed by advantageous signal processing based on an identification algorithm. Even in the case of the change in temperature of the fluid to be measured, the mixing of air bubbles, or the rapid change of the fluid to be measured from the gas to the liquid, the stable measurement may be always performed with constant precision. The phase measurement with high filtering performance is advantageous, and hence high performance may be provided.

According to the signal processing apparatus in the present invention, even when the temperature of the fluid to be measured changes, even when air bubbles are mixed into the fluid to be measured, or even when the fluid to be measured rapidly changes from a gas to a liquid, the stable measurement may be always performed with constant precision, and the phase measurement with high filtering performance may be realized with a small computing processing amount.

According to a Coriolis flowmeter in the present invention, even when the temperature of the fluid to be measured changes, even when air bubbles are mixed into the fluid to be measured, or even when the fluid to be measured rapidly changes from a gas to a liquid, the stable measurement may be always performed with constant precision, and the phase measurement with high filtering performance may be realized with a small computing processing amount.

BRIEF DESCRIPTION OF THE DRAWINGS

FIGS. 7(A)-(C) are diagrams illustrating timing charts for the specific structure of the signal processing apparatus illustrated in FIG. 5.

DETAILED DESCRIPTION OF THE INVENTION

It is an object of the present invention to be able to always perform measurement with constant precision, to realize phase measurement with high filtering performance, and to be able to reduce a computing processing amount to an extremely small amount. Even when a temperature of a fluid to be measured changes, even when air bubbles are mixed into the fluid to be measured, or even when the fluid to be measured rapidly changes from a gas to a liquid, the object may be realized.

Embodiment 1

Hereinafter, Embodiment 1 of a mode for carrying out the present invention is described with reference to FIGS. 1 to 7.

Figure 1:
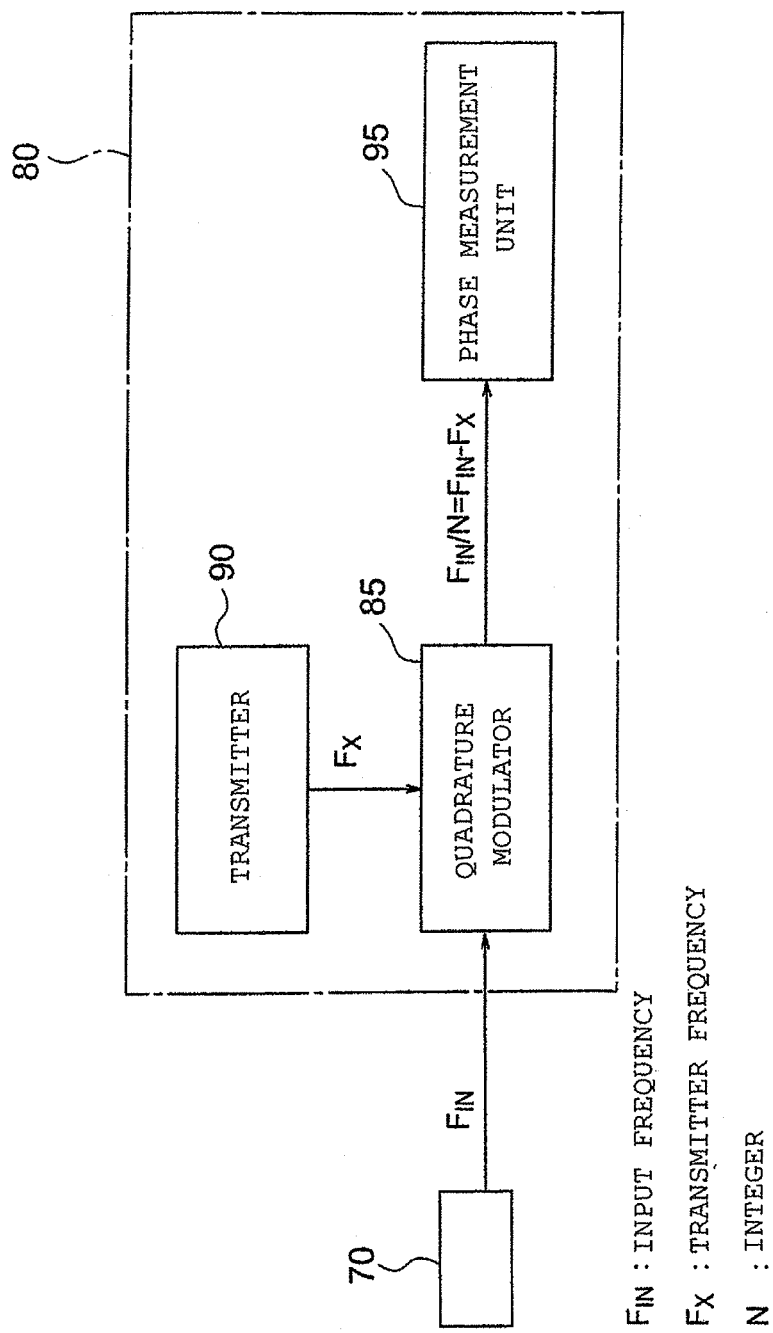
FIG. 1 is a block diagram illustrating a principle of a signal processing method and apparatus according to the present invention.

FIG. 1 is a diagram illustrating the principle of the signal processing method and apparatus according to the present invention.

Figure 10:
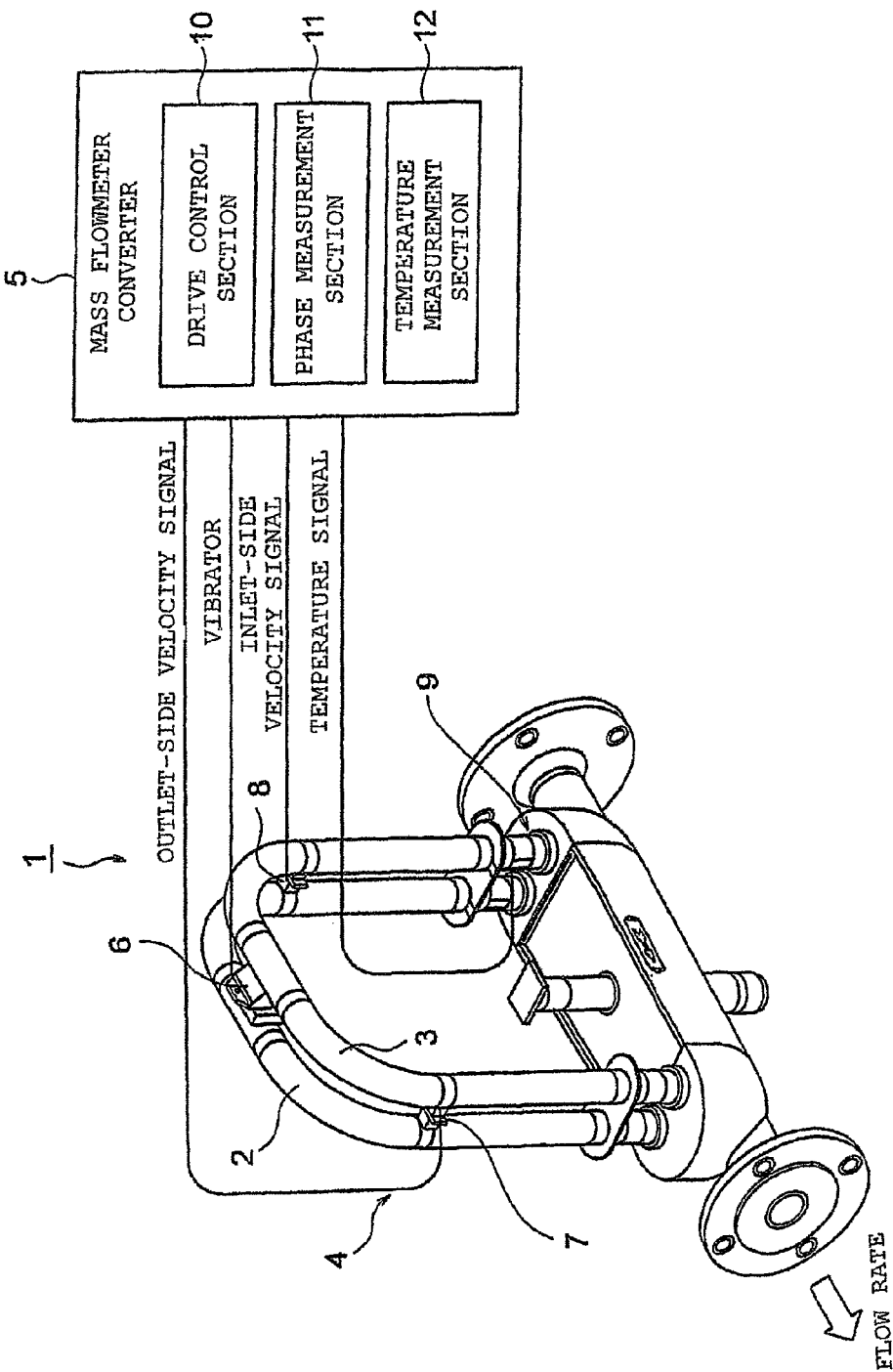
FIG. 10 is a structural diagram illustrating a general Coriolis flowmeter to which the present invention is applied.
Figure 11:
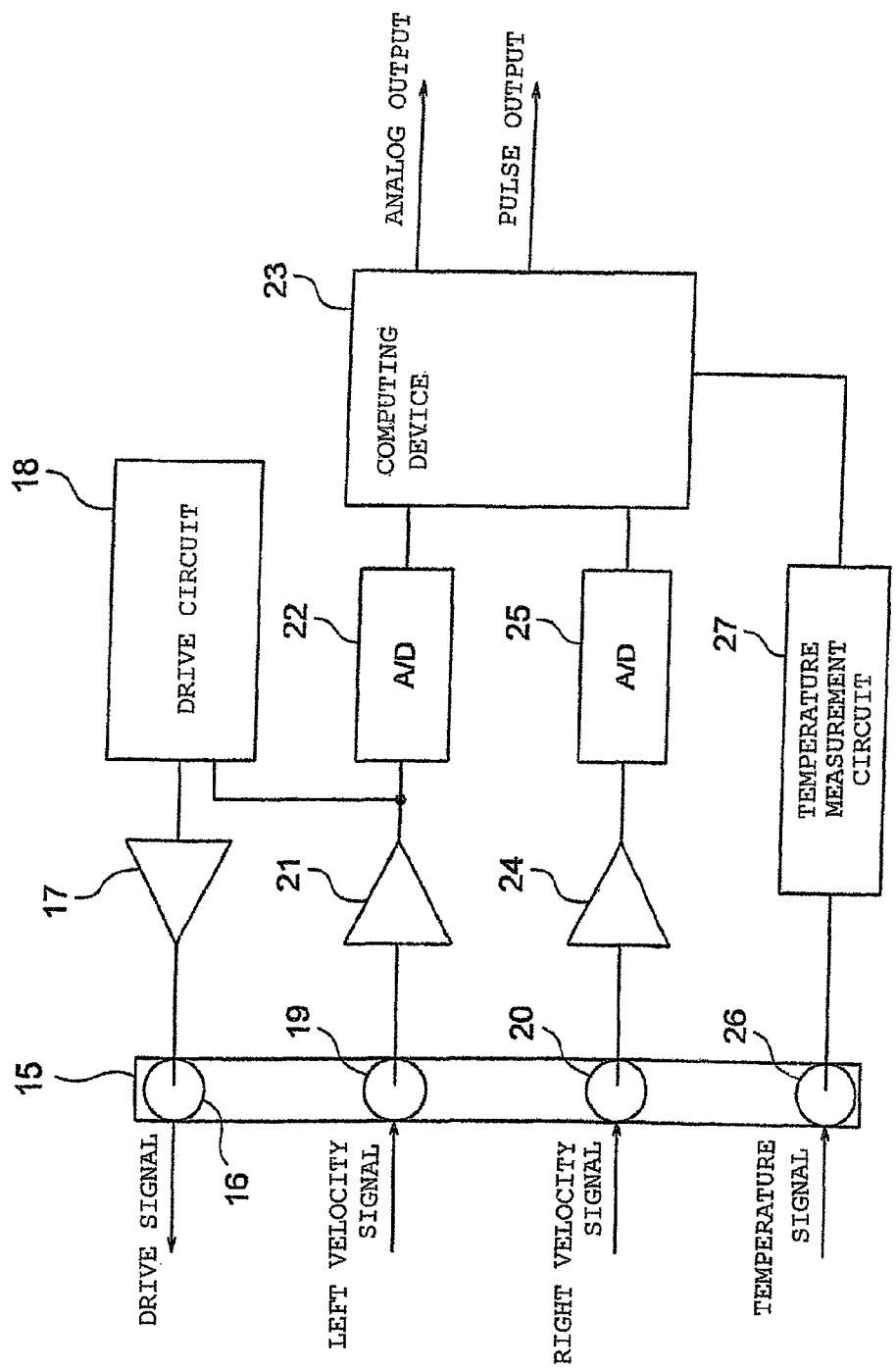
FIG. 11 is a block structural diagram illustrating a Coriolis flowmeter converter of the Coriolis flowmeter illustrated in FIG. 10.
Figure 12:
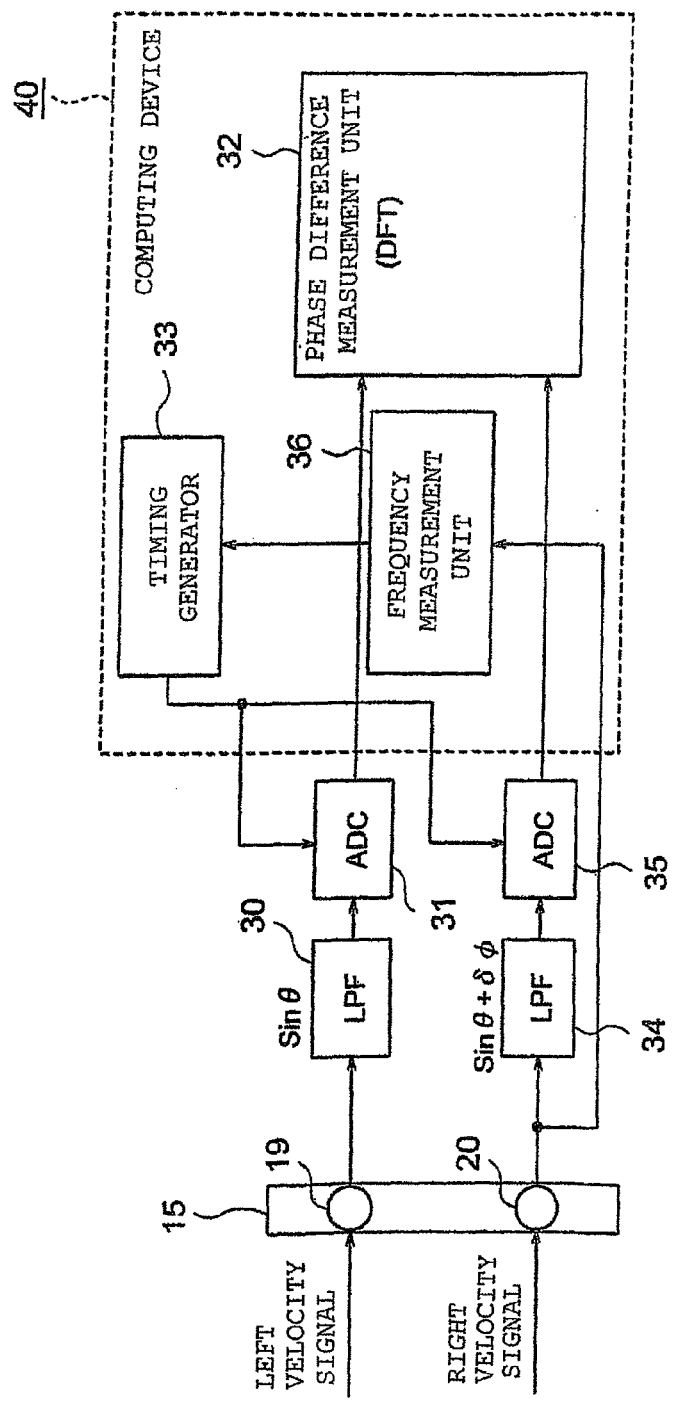
FIG. 12 is a block diagram illustrating a phase measurement method using Fourier transform for the Coriolis flowmeter converter illustrated in FIG. 11.
Figure 13:
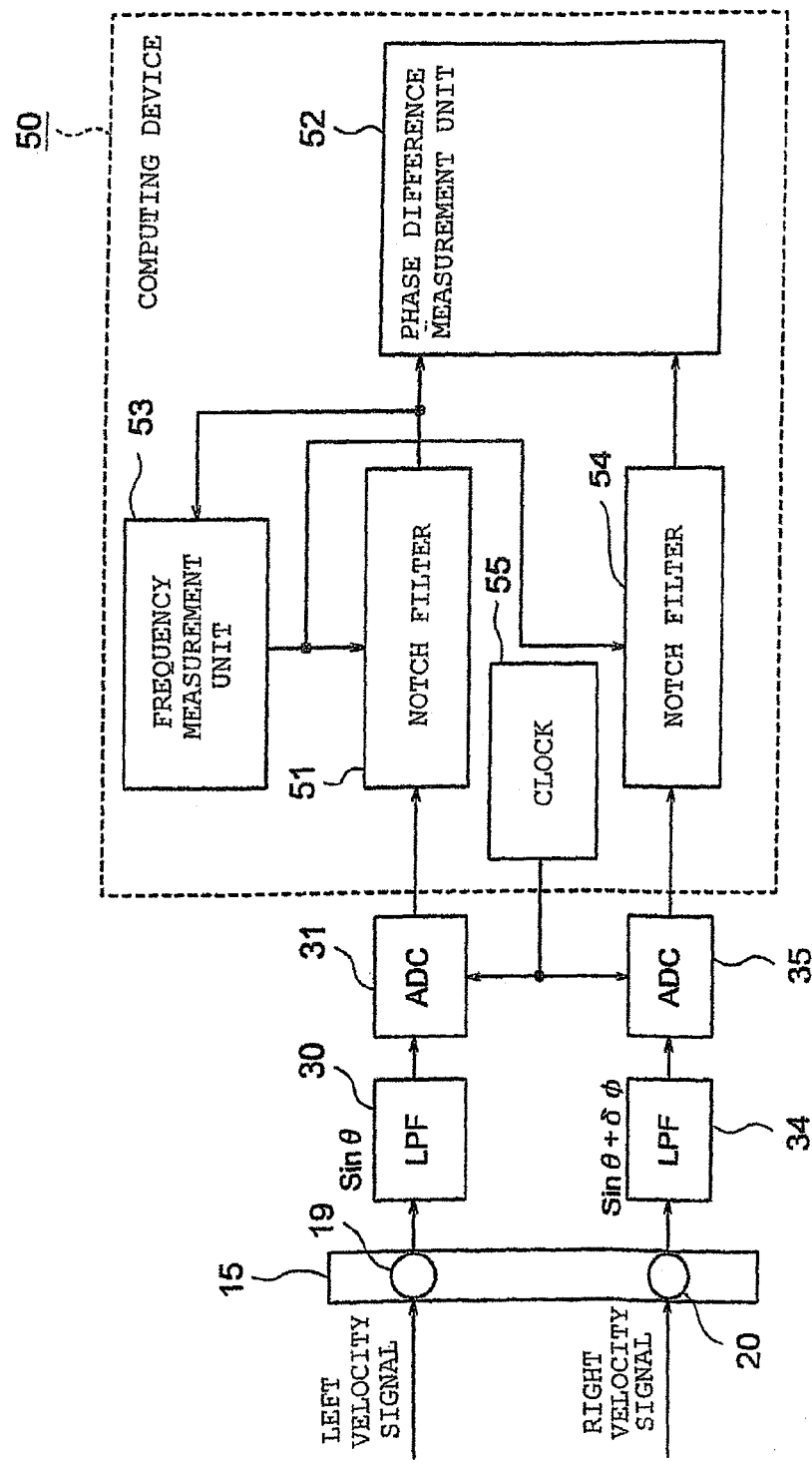
FIG. 13 is a block diagram illustrating a phase measurement method using notch filters for the Coriolis flowmeter converter illustrated in FIG. 11.
Figure 14:
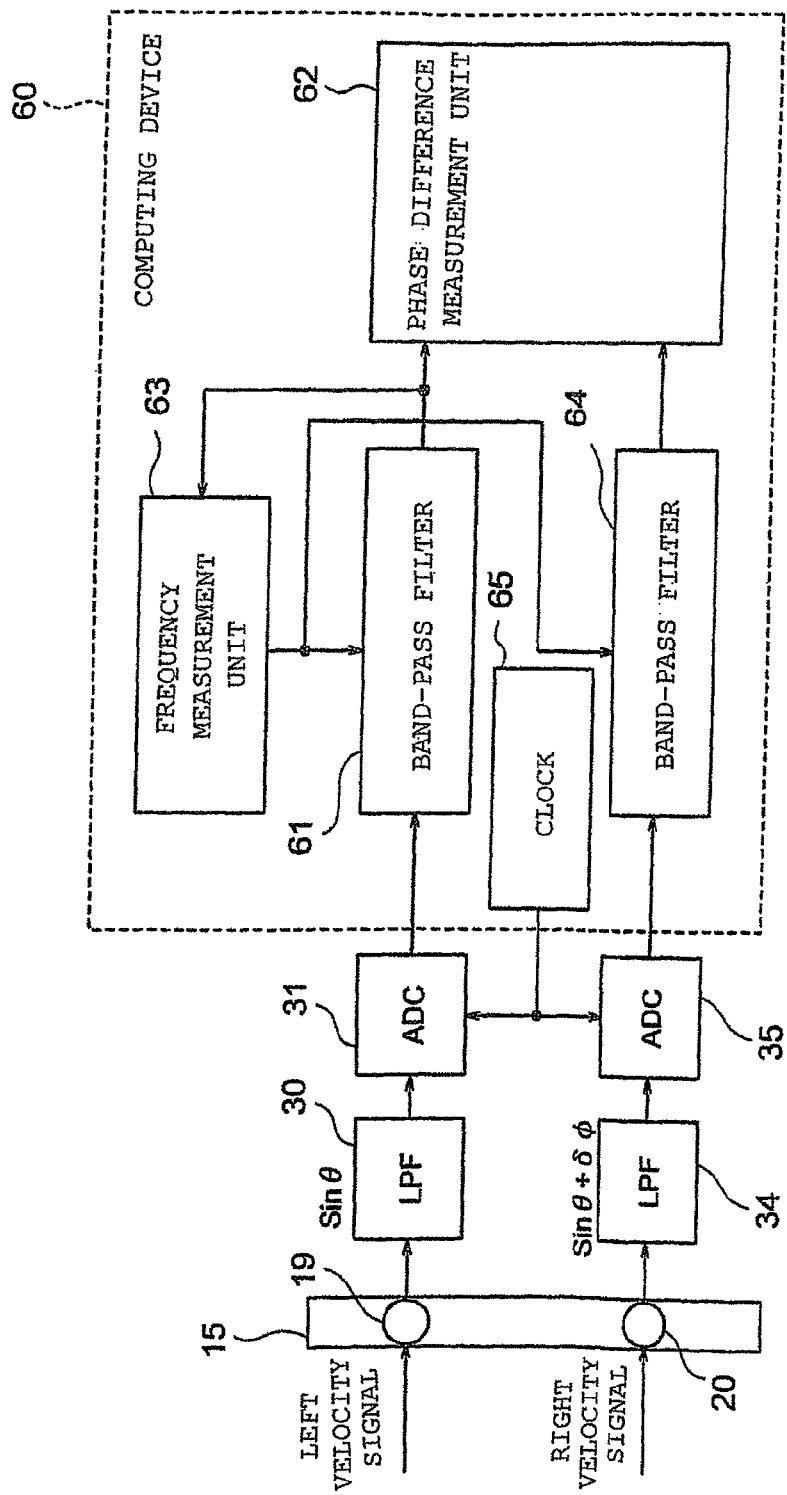
FIG. 14 is a block diagram illustrating a phase measurement method using band-pass filters for the Coriolis flowmeter converter illustrated in FIG. 11.

In FIG. 1, when measurement tubes 2 and 3 are vibrated by a vibrator 6, vibration velocities generated in the measurement tubes 2 and 3 are detected by a vibration velocity sensor 70. The detected vibration velocities are computed and processed by a vibration velocity signal computing device 80. The vibration velocity sensor 70 corresponds to the left velocity sensor 7 and the right velocity sensor 8 of FIG. 10.

The vibration velocity signal computing device 80 includes a quadrature modulator 85, a transmitter 90, and a phase measurement unit 95.

The quadrature modulator 85 performs quadrature modulation on the vibration velocities which are generated in the measurement tubes 2 and 3 and detected by the vibration velocity sensor 70 when the measurement tubes 2 and 3 are vibrated by the vibrator 6. A signal from the transmitter 90 is input to the quadrature modulator 85.

Then, signals obtained by quadrature modulation by the quadrature modulator 85 are input to the phase measurement section 95 provided in a subsequent stage of the quadrature modulator 85. The phase measurement section 95 performs A/D conversion on the velocity signals from the vibration velocity sensor 70, to thereby perform digital conversion processing, and then obtains a phase difference therebetween.

According to the signal processing method and apparatus illustrated in FIG. 1, the input signal is subjected to 1/N quadrature frequency conversion and the phase measurement is performed after the frequency conversion, and hence an input frequency band is reduced to 1/N and stable phase measurement may be performed.

As described above, according to the present invention, the phase and velocity signal input from the sensor is converted into the 1/N (N is arbitrary number) frequency by frequency conversion and the phase difference after conversion is measured. Therefore, the filter having the same band is always used to realize the present invention. Even when the frequency of the phase and velocity signal is changed by a change in density or temperature of the fluid to be measured, the flow rate may be measured without almost affecting calculation precision or computing interval.

Figure 2:
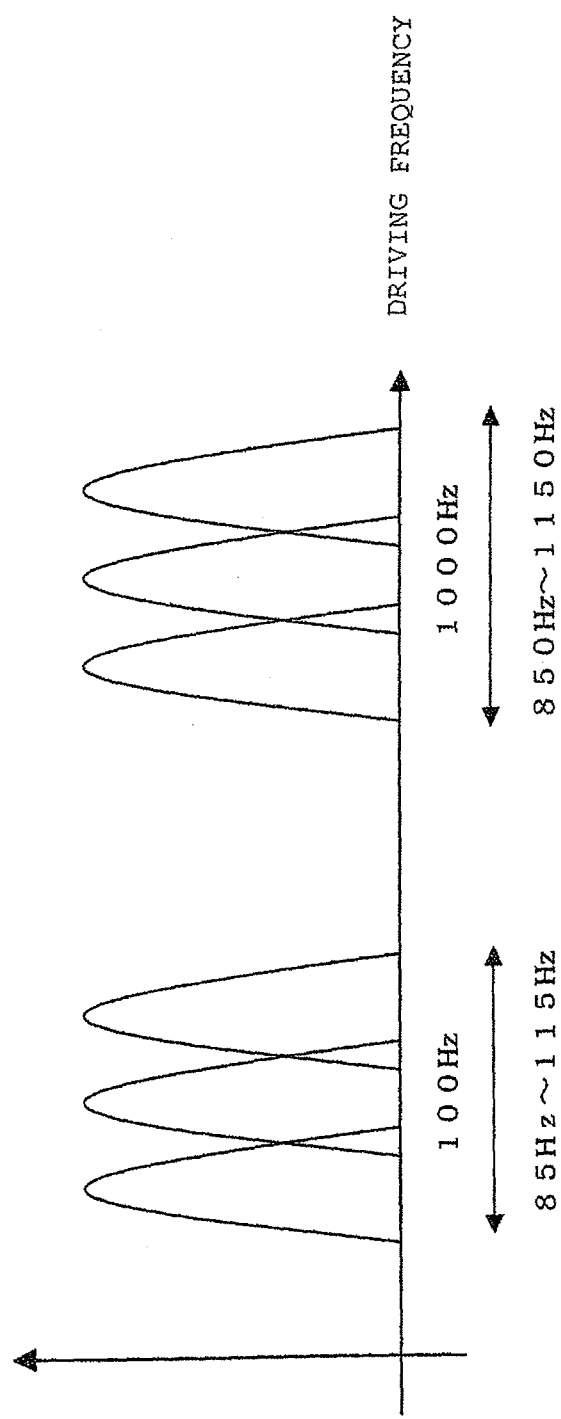
FIG. 2 is a diagram illustrating a frequency waveform of a Coriolis flowmeter of which a driving frequency is 100 Hz and a frequency waveform of a Coriolis flowmeter of which a driving frequency is 1,000 Hz in the signal processing apparatus illustrated in FIG. 1.

For example, in the Coriolis flowmeter of which the driving frequency is 100 Hz as illustrated in FIG. 2, when a filter frequency band is set to a range of 95 Hz to 105 Hz, it is likely to shift the driving frequency outside the filter frequency band by the change in density or temperature. Therefore, filter tables for frequency bands around the filter frequency band, for example, a table for a range of 85 Hz to Hz and a table for a range of 105 Hz to 115 Hz are required. When the filter frequency band is widened, the number of tables is reduced. However, a measurement waveform becomes a noisy phase and velocity signal, and hence measurement precision is significantly degraded.

When a phase and velocity signal of the Coriolis flowmeter of which the driving frequency is 1,000 Hz is to be measured, it is necessary to change a sampling rate and a filter table, and hence the calculation precision or the computing interval changes.

Figure 3:
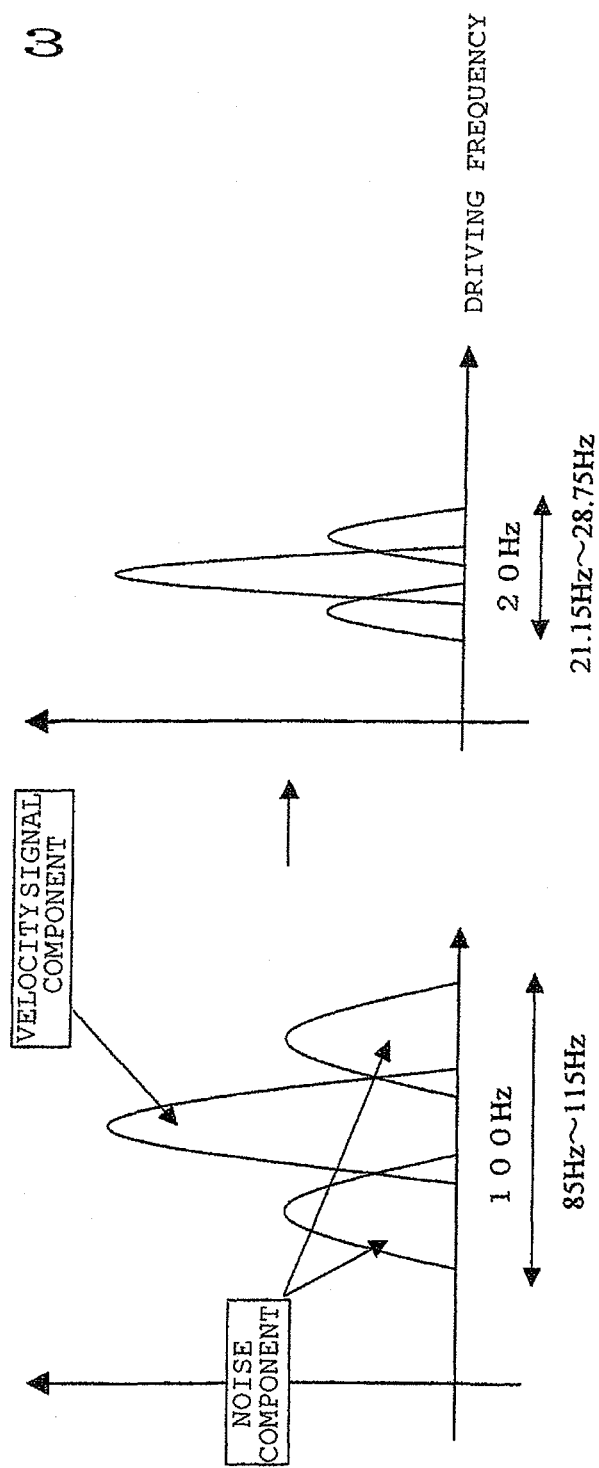
FIG. 3 is a diagram illustrating a frequency waveform in a case where the driving frequency of the Coriolis flowmeter of which the driving frequency is 100 Hz is divided.

In the Coriolis flowmeter of which the driving frequency is 100 Hz in signal processing according to the present invention, as illustrated in FIG. 3, for example, when a value of N is set to 4 in a case where a frequency of a phase and velocity signal input from the sensor is 100 Hz, the frequency is converted into 100/4 Hz, that is, 25 Hz. After the frequency conversion, the phase and velocity signal is filtered and then phase calculation is performed.

In a case where the used filter band is a band of approximately 20 Hz to 30 Hz, even when the driving frequency is changed by the change in density or temperature, the same filter table may be always used outside a band of 80 Hz to 120 Hz. Therefore, the measurement may be always made at stable calculation precision and computing interval.

Further, in the Coriolis flowmeter of which the driving frequency is 1,000 Hz, when the value of N is set to 40, the flow rate may be measured based on the same filter band as in the Coriolis flowmeter of which the driving frequency is 100 Hz.

Figure 4:
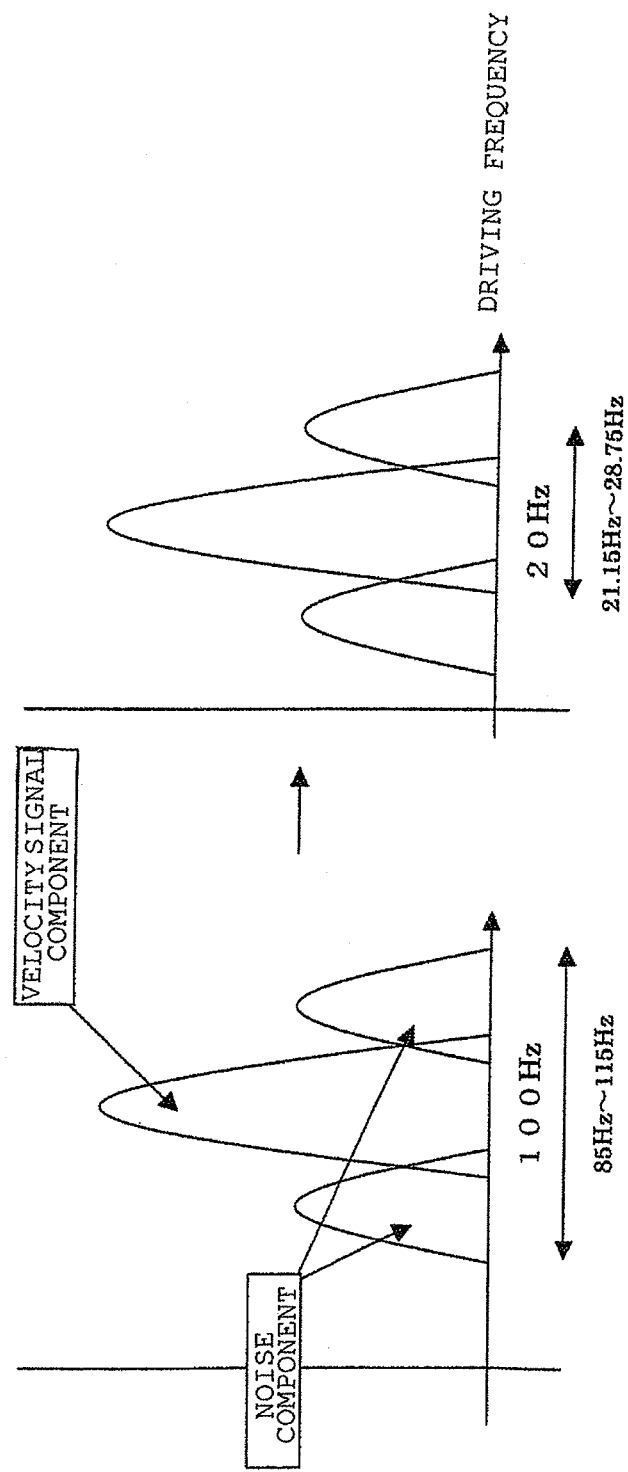
FIG. 4 is a diagram illustrating a frequency waveform in a case where the driving frequency of the Coriolis flowmeter of which the driving frequency is 100 Hz is shifted.

Further, in the present invention, as illustrated in FIG. 4, the method of performing the 1/N conversion on the phase and velocity signal includes a method of frequency shifting the input frequency without being divided. In the case of the Coriolis flowmeter as illustrated in FIG. 4, the input frequency is frequency shifted without being divided, and hence there is a feature that the flow rate may be calculated without loss of a filtering effect.

For example, when the input signal is subjected to 1/N frequency division as in the case of the Coriolis flowmeter illustrated in FIG. 3, a noise component is also subjected to 1/N frequency division. Therefore, even when a filtering band is narrowed, the effect cannot be much expected.

Thus, when the phase and velocity signal is subjected to 1/N conversion by frequency shifting as in the case of the Coriolis flowmeter illustrated in FIG. 4, the noise component is simultaneously shifted in frequency, but the filter band may be reduced to 1/N, and hence very effective filtering may be achieved as compared with before frequency shifting.

Figure 5:
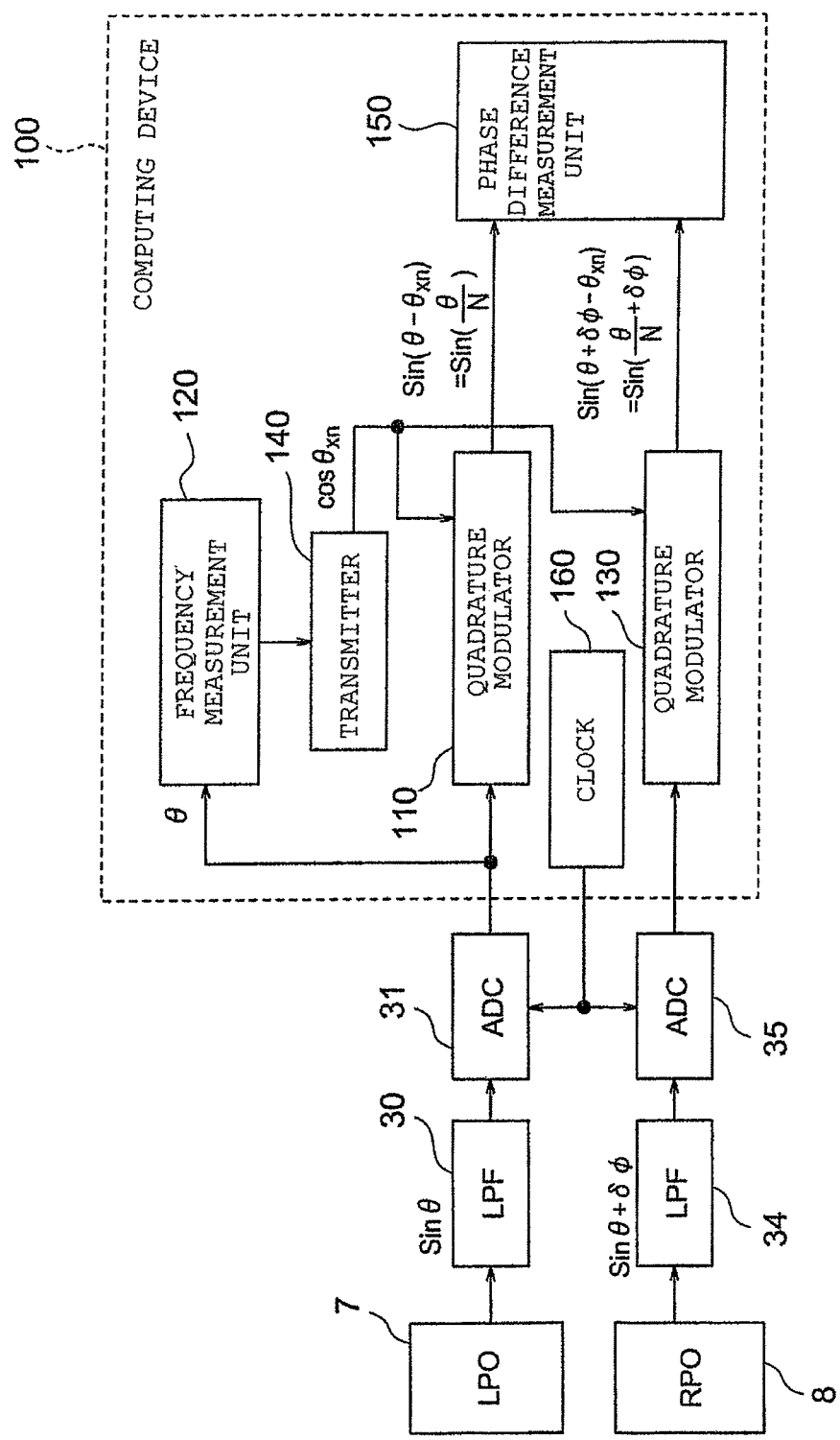
FIG. 5 is a specific structural diagram illustrating the signal processing apparatus illustrated in FIG. 1.

FIG. 5 illustrates the specific structure of the signal processing apparatus illustrated in FIG. 1.

In FIG. 5, a left pick-off (LPO) 7 (corresponding to left velocity sensor 7) is connected to a low-pass filter 30. That is, during vibration using the vibrator 6, when a detection signal of a vibration velocity (outlet-side velocity signal) which is generated on the left side of the measurement tubes 2 and 3 is detected by the left pick-off 7, the detection signal of the vibration velocity (outlet-side velocity signal) is input to the low-pass filter 30.

The low-pass filter 30 is a circuit for extracting, through a frequency filter, only a low-frequency left velocity signal (outlet-side velocity signal) from the left velocity signal (outlet-side velocity signal) output from the left velocity sensor 7 detecting the vibration velocity generated on the left side of the measurement tubes 2 and 3 in the case where the measurement tubes 2 and 3 are vibrated by the vibrator 6.

The low-pass filter 30 is connected to an A/D converter 31. The A/D converter 31 converts the left velocity signal (outlet-side velocity signal) which is the analog signal output from the low-pass filter 30 into a digital signal. The left velocity signal (outlet-side velocity signal) obtained as the digital signal by conversion by the A/D converter 31 is input to a signal processing apparatus 100.

On the other hand, a right pick-off (RPO) 8 (corresponding to right velocity sensor 8) is connected to a low-pass filter 34. That is, during vibration using the vibrator 6, when a detection signal of a vibration velocity (inlet-side velocity signal) which is generated on the right side of the measurement tubes 2 and 3 is detected by the right pick-off 8, the detection signal of the vibration velocity (inlet-side velocity signal) is input to the low-pass filter 34.

The low-pass filter 34 is a circuit for extracting, through a frequency filter, only a low-frequency right velocity signal (inlet-side velocity signal) from the right velocity signal (inlet-side velocity signal) output from the right velocity sensor 8 detecting the vibration velocity generated on the right side of the measurement tubes 2 and 3 in the case where the measurement tubes 2 and 3 are vibrated by the vibrator 6.

The low-pass filter 34 is connected to an A/D converter 35. The A/D converter 35 converts the right velocity signal (inlet-side velocity signal) which is the analog signal output from the low-pass filter 34 into a digital signal.

Further, the signal processing apparatus 100 is connected to the A/D converter 35. The signal processing apparatus 100 performs 1/N quadrature frequency conversion on each of the right velocity signal (inlet-side velocity signal) and the left velocity signal (outlet-side velocity signal) and performs the phase measurement after the frequency conversion, so as to reduce the input frequency band to 1/N and realize stable phase measurement.

In the signal processing apparatus 100, the signal from the A/D converter 31 is connected to a quadrature modulator 110. The quadrature modulator 110 performs 1/N quadrature frequency conversion on the left velocity signal (outlet-side velocity signal).

Further, the signal from the A/D converter 31 is connected to a frequency measurement unit 120. The frequency measurement unit 120 measures a frequency of the left velocity signal (outlet-side velocity signal) obtained by converting, into a digital signal, by the A/D converter 31, the left velocity signal (outlet-side velocity signal) output from the left velocity sensor 7 detecting the vibration velocity generated on the left side of the measurement tubes 2 and 3 in the case where the measurement tubes 2 and 3 are vibrated by the vibrator 6.

Further, the signal from the A/D converter 35 is connected to a quadrature modulator 130. The quadrature modulator 130 performs 1/N quadrature frequency conversion on the right velocity signal (inlet-side velocity signal).

A frequency measurement value measured by the frequency measurement unit 120 is output to a transmitter 140. The transmitter 140 transmits a signal having a predetermined frequency based on the frequency measurement value output from the frequency measurement unit 120.

The output signal from the transmitter 140 is input to the quadrature modulator 110 and the quadrature modulator 130. A carrier frequency is obtained through the frequency measurement unit 120, the transmitter 140, and the quadrature modulator 110. The frequency of the left velocity signal (outlet-side velocity signal) input from the A/D converter 31 and the frequency of the signal output from the transmitter 140 are modulated by the quadrature modulators 110. A result obtained by modulation, that is, one of a sum of or difference between the frequencies of both the input signals based on the addition theorem is used for frequency shifting. The frequency of the signal output from the transmitter 140 is controlled such that the modulated frequency becomes 1/N of the frequency of the input left velocity signal (outlet-side velocity signal).

When the transmitter 140 is controlled as described above, as in the case of the quadrature modulator 110, also in the quadrature modulator 130, the frequency obtained after performing the frequency conversion is controlled to become 1/N of the frequency of the right velocity signal (inlet-side velocity signal) input from the A/D converter 35, based on the frequency of the signal output from the transmitter 140.

A phase difference measurement unit 150 is connected to the quadrature modulator 110 and the quadrature modulator 130. The phase difference measurement unit 150 performs phase measurement based on (i) a frequency, corresponding to 1/N of the frequency of the left velocity signal (outlet-side velocity signal) which is input from the A/D converter 31, of a signal output from the quadrature modulator 110 and (ii) a frequency, corresponding to 1/N of the frequency of the right velocity signal (inlet-side velocity signal) which is input from the A/D converter 35, of a signal output from the quadrature modulator 130.

When such a structure is employed, according to this embodiment, the frequencies of the left velocity signal and right velocity signal are converted into low frequency bands (1/N of the frequencies). Therefore, the input frequency bands of the left velocity signal and right velocity signal become 1/N and the number of filter tables is significantly reduced. In addition, the phase measurement processing may be more effectively performed.

A clock signal is input from a clock 160 to the A/D converter 31 and the A/D converter 35. The clock 160 synchronizes the outputs of the A/D converter 31 and the A/D converter 35, and synchronizes the digital signal of the left velocity signal output from the A/D converter 31 and the digital signal of the right velocity signal output from the A/D converter 35.

The quadrature modulator 110, the frequency measurement unit 120, the quadrature modulator 130, the transmitter 140, the phase difference measurement unit 150, and the clock 150 are included in the signal processing apparatus 100.

Next, a specific computing method of phase difference measurement computation in the signal processing apparatus 100 illustrated in FIG. 5 is described.

When the measurement tubes 2 and 3 are vibrated by the vibrator 6 of a Coriolis flowmeter 1, the output signals (left velocity signal and right velocity signal) from the vibration velocity sensor 70 (left pick-off 7 and right pick-off 8) provided in the measurement tubes 2 and 3 are obtained as input signals of the LPO and the RPO as illustrated in FIG. 2.

In this case, the input signals of the LPO and the RPO are defined as follows (where $\delta\phi$ represents the phase difference between LPO and RPO).

[Expression 1]

$$\text{Left pick-off: } \sin(\theta) \qquad (1)$$

[Expression 2]

$$\text{Right pick-off: } \sin(\theta+\delta\phi) \qquad (2)$$

The output signals (left velocity signal LPO and right velocity signal RPO) from the two sensors (left pick-off 7 and the right pick-off 8) are converted from the analog signals into the digital signals by the A/D converters 31 and 35 through the low-pass filters 30 and 34 provided in the converter of the Coriolis flowmeter 1, respectively, and then transferred to the signal processing apparatus 100.

As described above, the signal processing apparatus 100 is divided into four blocks including the quadrature modulators 110 and 130, the frequency measurement unit 120, the transmitter 140, and the phase difference measurement unit 150. A phase difference between the output signal LPO from the left pick-off 7 and the output signal RPO from the right pick-off 8 is computed, and then converted into a flow rate signal based on the signal output from the frequency measurement unit 120 and temperature data detected by a temperature sensor.

Figure 6:
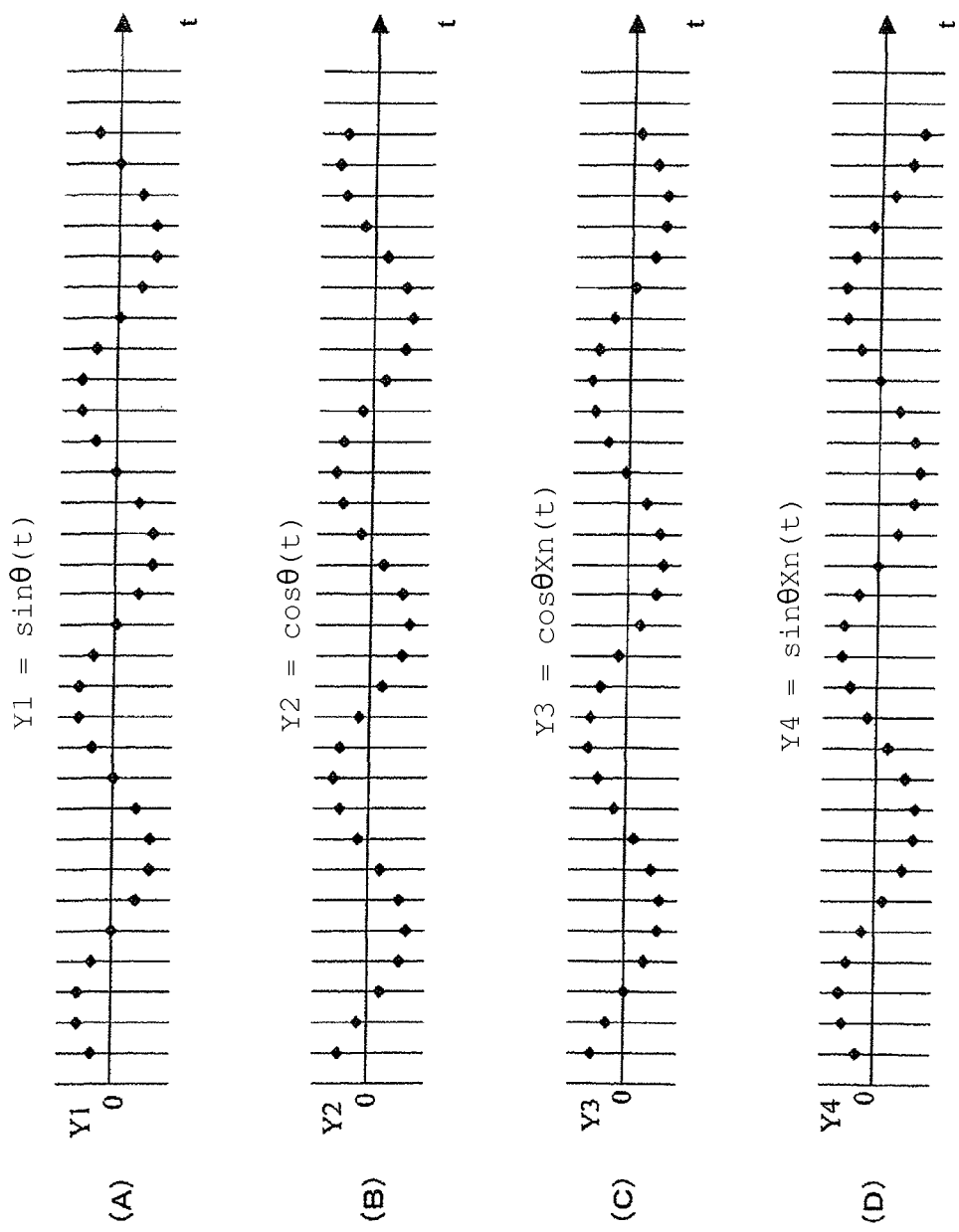
FIGS. 6(A)-(D) are diagrams illustrating timing charts for the specific structure of the signal processing apparatus illustrated in FIG. 5.

Next, an operation of the signal processing apparatus 100 illustrated in FIG. 5 is described with reference to time charts illustrated in FIGS. 6 and 7.

First, in the low-pass filter 30 illustrated in FIG. 5, when a harmonic noise is removed to eliminate the influence of aliasing in A/D conversion, a sine signal ($\sin \theta(t)$) is output.

When the sine signal ($\sin \theta(t)$) is output, the sine signal ($\sin \theta(t)$) is input to the A/D converter 31. Then, the signal is sampled for digital signal conversion at an arbitrary constant interval by the A/D converter 31 to obtain a sampling signal ($Y1=\sin \theta(t)$) as illustrated in FIG. 6(A) and output from the A/D converter 31.

The sampling signal ($Y1=(\sin \theta(t))$ illustrated in FIG. 6(A), which is output from the A/D converter 31, is input to the quadrature modulator 110 and the frequency measurement section 120 of the signal processing apparatus 100 illustrated in FIG. 5.

The frequency measurement section 120 of the signal processing apparatus 100 measures the frequency of the left velocity signal (outlet-side velocity signal) which is obtained as the digital signal by conversion by the A/D converter 31.

When the left velocity signal (outlet-side velocity signal) which is obtained as the digital signal by conversion by the A/D converter 31 is input to the quadrature modulator 110 of the signal processing apparatus 100 illustrated in FIG. 5, the input signal (sin θ(t)) from the A/D converter 31 is subjected to 90-degree shifting in the inner portion to generate a signal (cos θ(t)) as illustrated in FIG. 6(B).

A frequency signal measured based on the digital signal output from the A/D converter 31 is output from the frequency measurement section 120 of the signal processing apparatus 100.

A measurement value of the output signal frequency output from the frequency measurement section 120 is input to the transmitter 120. The transmitter 120 to which the output signal frequency is input generates the transmission frequency signal ($\theta_{Xn}$(t)) satisfying the following expression $$\theta_{Xn}(t) = \theta(t) \times (1 - 1/N)$$

based on the output signal frequency, and outputs a cosine signal (Y3=cos $\theta_{Xn}$(t)) as illustrated in FIG. 6(C) at the same transmission output rate as the sampling interval of the input signal in the A/D converter 31.

The cosine signal (Y3=cos $\theta_{Xn}$(t)) as illustrated in FIG. 6(C), which is output from the transmitter 120, is input to the quadrature modulator 110. When the cosine signal (Y3=cos $\theta_{Xn}$(t)) as illustrated in FIG. 6(C) is input to the quadrature modulator 110, the cosine signal (Y3=cos $\theta_{Xn}$(t)) as illustrated in FIG. 6(C), which is input from the transmitter 140, is subjected to 90-degree shifting to generate a sine signal (Y4=sin $\theta_{Xn}$(t)) as illustrated in FIG. 6(D).

In the quadrature modulator 110, quadrature frequency conversion is performed for modulation shifting based on the 0-degree signal and 90-degree signal of the input signal from the A/D converter 31 and the 0-degree signal and 90-degree signal of the input signal from the transmitter 140, so as to generate, as the 1/N-signal of the input signal from the A/D converter 31, a sine signal (Y5=sin θ(t)·cos $\theta_{Xn}$(t)−cos θ(t)·sine $\theta_{Xn}$(t)=sin(θ(t)/N)) as illustrated in FIG. 7(A). The sine signal (Y5=sin θ(t)·cos $\theta_{Xn}$(t)−cos θ(t)·sine $\theta_{Xn}$(t)=sin(θ(t)/N)) as illustrated in FIG. 7(A), which is generated by the quadrature modulator 110 is output from the quadrature modulator 110 of the signal processing apparatus 100 illustrated in FIG. 5 and input to the phase difference measurement unit 150.

Further, in the low-pass filter 34 illustrated in FIG. 5, when a harmonic noise is removed to eliminate the influence of aliasing in A/D conversion, a sine signal (sin(θ(t)+δφ(t))) is output, where δφ(t) represents the phase difference as a function of time between the vibration velocity signal output from the LPO 7 and the vibration velocity signal output from the RPO 8.

When the sine signal (sin(θ(t)+δφ(t))) is output from the low-pass filter 34, the sine signal (sin(θ(t)+δφ(t))) is input to the A/D converter 35. Then, the signal is sampled for digital signal conversion at an arbitrary constant interval by the A/D converter 35.

The sampling signal (sin(θ(t)+δφ(t))) output from the A/D converter 35 is subjected to 90-degree shifting in the inner portion of the quadrature modulator 130 to generate a cosine signal (cos(θ(t)+δφ(t))).

The cosine signal (Y3=cos $\theta_{Xn}$(t)) as illustrated in FIG. 6(C), which is output from the transmitter 120, is input to the quadrature modulator 130. When the cosine signal (Y3=cos $\theta_{Xn}$(t)) as illustrated in FIG. 16(C) is input to the quadrature modulator 130, the cosine signal (Y3=cos $\theta_{Xn}$(t)) as illustrated in FIG. 6(C), which is input from the transmitter 140, is subjected to 90-degree shifting to generate a sine signal (Y4=sin $\theta_{xn}$(t)) as illustrated in FIG. 6(D).

In the quadrature modulator 130, quadrature frequency conversion is performed for modulation shifting based on the 0-degree signal and 90-degree signal of the input signal from the A/D converter 35 and the 0-degree signal and 90-degree signal of the input signal from the transmitter 140, so as to generate, as the 1/N-signal of the input signal from the A/D converter 35, a sine signal (Y6=(sin(θ(t)+δφ(t)−$\theta_{Xn}$(t))=sin(θ(t)/(N+δφ(t)))) as illustrated in FIG. 7(B). The sine signal (Y6=(sin(θ(t)+δφ(t)−$\theta_{Xn}$(t))=sin(θ(t)/(N+δφ(t))))) as illustrated in FIG. 7(B), which is generated by the quadrature modulator 130 is output from the quadrature modulator 130 of the signal processing apparatus 100 illustrated in FIG. 5 and input to the phase difference measurement unit 150.

As described above, both the sine signal (Y5=sin(θ(t)/N)) as illustrated in FIG. 7(A), which is output from the quadrature modulator 110, and the sine signal (Y6=sin(θ(t)/(N+δφ(t)))) as illustrated in FIG. 7(B), which is output from the quadrature modulator 130, are input to the phase difference measurement unit 150.

In the phase difference measurement unit 150, a signal (Y7=δφ(t)) illustrated in FIG. 7(C) is output as a phase difference δφ (t) based on the sine signal (Y5=sin(θ(t)/N)) illustrated in FIG. 7(A), which is output from the quadrature modulator 110 and input to the phase difference measurement unit 150, and the sine signal (Y6=sin(θ(t)/(N+δφ(t)))) illustrated in FIG. 7(B), which is output from the quadrature modulator 130 and input to the phase difference measurement unit 150.

When the computing interval is synchronized with the sampling time as described above, the real time performance for phase measurement may be improved.

Further, each of the set of vibration velocity signals is subjected to the same processing for phase calculation, and hence there is almost no computing error. Therefore, accurate phase calculation may be achieved.

Embodiment 2

Hereinafter, Embodiment 2 of a mode for carrying out the present invention is described with reference to FIGS. 8 and 9.

Figure 8:
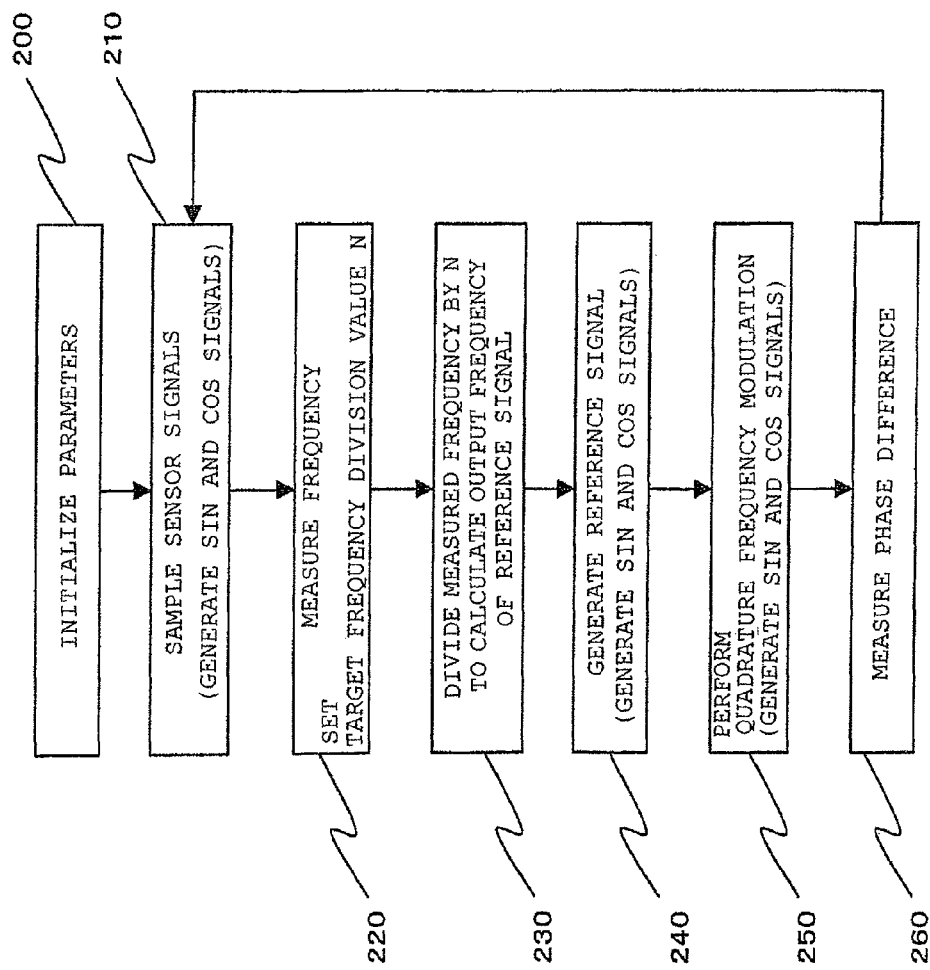
FIG. 8 is an operational flow chart for the specific structure of the signal processing apparatus illustrated in FIG. 5.

FIG. 8 is the flow chart illustrating quadrature frequency modulation and phase measurement in phase difference measurement computation of the vibration velocity signal computing device 80 illustrated in FIG. 1, which is used for the signal processing apparatus 100 illustrated in FIG. 5.

In FIG. 8, in Step 200, parameters of the vibration velocity signal computing device 80 illustrated in FIG. 1 are initialized. When the parameters of the vibration velocity signal computing device 80 are initialized in Step 200, in Step 210, the phase and velocity signals from the two sensors (left pick-off 7 and right pick-off 8) are sampled at arbitrary sampling intervals by the A/D converter 31 and the A/D converter 35 to generate a sine waveform and a cosine waveform, respectively, based on the sampled data.

When the sine waveform and the cosine waveform are generated in Step 210, in Step 220, the frequency of the sampled data is measured by the frequency measurement unit 120 and an N-value is determined based on the measured frequency.

When the N-value is determined in Step 220, in Step 230, the measured frequency is divided by a set target frequency division value "N" to determine a frequency after quadrature frequency conversion.

When the frequency after quadrature frequency conversion is determined in Step 230, in Step 240, a sine reference signal waveform and a cosine reference signal waveform are generated by the reference signal transmitter 140 and the quadrature frequency conversion is performed by the quadrature modulators 110 and 130 based on the reference waveforms. As a result, each frequency-modulated signal has a value equal to 1/N of the input frequency.

When the quadrature frequency conversion is performed in Step 240, in Step 250, the quadrature modulators 110 and 130 send, to the phase difference measurement unit 150, the sine signal and the cosine signal which are generated as the sine waveform and the cosine waveform each having a frequency equal to 1/N of the input frequency by quadrature frequency conversion, based on the reference waveforms, on the signals obtained by sampling the phase and velocity signals at the arbitrary sampling intervals by the A/D converter 31 and the A/D converter 35.

When the sine signal and the cosine signal are sent to the phase difference measurement unit 150 in Step 250, in Step 260, the phase difference measurement unit 150 calculates the phase difference based on the sine signal and the cosine signal which are the phase and velocity signals having the 1/N frequency which are obtained by the frequency modulation and output from the quadrature frequency modulators 110 and 130. The phase and velocity signals obtained by the frequency conversion is used for phase measurement.

(1) Frequency Measurement Unit

In this embodiment, a method using the principle of phase-locked loop (PLL) is used for the frequency measurement method. The PLL is an electronic circuit in which a signal which is equal in frequency to an input alternating current signal and locked in phase therewith is output from another oscillator by feedback control.

Therefore, the PLL is fundamentally a phase-lock circuit and may produce a signal locked in phase with an input signal.

The PLL is an oscillation circuit for feedback-controlling an oscillator in a loop for oscillation so that a phase difference between a reference signal input from an outside and an output from the oscillator in the loop is constant. Therefore, the PLL may be relatively easily constructed using a computing device and may perform high-speed computation.

Figure 9:
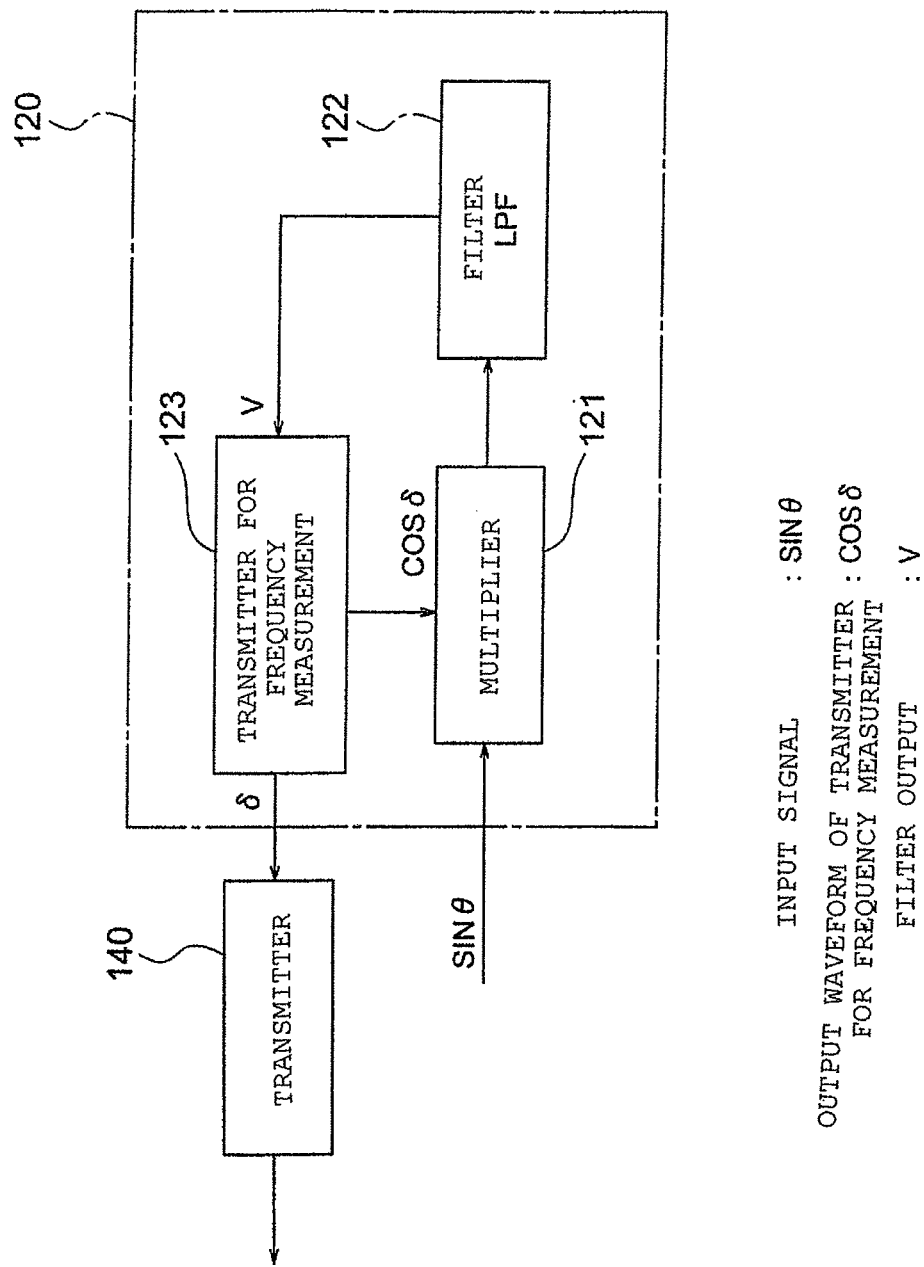
FIG. 9 is a block diagram illustrating a frequency measurement unit illustrated in FIG. 5.

The frequency measurement unit 120 has the structure as illustrated in FIG. 9.

That is, the A/D converter 31 is connected to a multiplier 121. An output from the A/D converter 31 is a left velocity signal (outlet-side velocity signal) $\sin \theta$ obtained in a case where a detection signal of a vibration velocity (outlet-side velocity signal) having a phase difference and/or a vibration frequency proportional to a Coriolis force, which is generated on the left side of the pair of measurement tubes 2 and 3 when the measurement tubes 2 and 3 are alternately driven by the vibrator 6, is detected by the left pick-off 7, input to the low-pass filter 30 to extract only a low-frequency left velocity signal (outlet-side velocity signal), and converted into a digital signal.

The multiplier 121 compares the phase of the left velocity signal (outlet-side velocity signal) $\sin \theta$ which is obtained as the digital signal by conversion by the A/D converter 31 with the phase of an output signal $\cos \delta$ output from the transmitter 123 for frequency measurement and outputs the signals to the low-pass filter 122.

Therefore, an output end of the multiplier 121 is connected to the low-pass filter 122. The low-pass filter 122 extracts only a low-frequency signal from the output signal output from the multiplier 121 through a frequency filter.

Thus, in the multiplier 121, by the product of the left velocity signal $\sin \theta$ by the output signal $\cos \delta$ of the transmitter for frequency measurement, a sum signal and a difference signal of $\theta$ and $\delta$ are generated. However, in this case, only a difference component is extracted from the output signal output from the multiplier 121.

The low-pass filter 122 is connected to the transmitter 123 for frequency measurement. The transmitter 123 for frequency measurement generates phase data $\delta$ based on the low-frequency signal output from the low-pass filter 122.

The transmitter 123 for frequency measurement outputs the output signal $\cos \delta$ to the multiplier 121. In the multiplier 121, the phase of the input data ($\sin \theta$) obtained as the digital value by conversion by the A/D converter 31 is compared with the phase of the output signal $\cos \theta$ and the difference signal and the sum signal thereof are output from the low-pass filter 122. A feedback loop is formed such that output data "V" (frequency computing function V) of only the difference component obtained by filtering by the low-pass filter 122 becomes 0.

When the structure as described above is described mathematically, as in the frequency measurement unit 120 illustrated in FIG. 9, the input signal is expressed by $\sin \theta$ and the output signal of the transmitter 123 for frequency measurement is expressed by $\cos \delta$. When the two waveforms are multiplied by the multiplier 121, the following is obtained.

[Expression 3]

$$\sin\theta \cdot \cos\theta = \frac{1}{2}(\sin(\theta + \delta) + \sin(\theta - \delta)) \quad (3)$$

Input waveform: $\sin \theta$

Output waveform of transmitter for frequency measurement: $\cos \delta$

When the multiplied value ($\sin \theta \cdot \cos \delta$) is filtered by the low-pass filter 122, a high-frequency component is removed by the low-pass filter 122. Therefore, the frequency computing function V output from the low-pass filter 122 is expressed as follows.

[Expression 4]

$$V = \sin(\theta - \delta) \quad (4)$$

When a value of $(\theta - \delta)$ in Expression (4) is a sufficiently small value ($V \approx 0$), the frequency computing function V may be approximately expressed as follows.

[Expression 5]

$$V = \theta - \delta \sim 0 \quad (5)$$

When an output waveform of the output signal of the transmitter 123 for frequency measurement is controlled so that the frequency computing function V becomes 0, the phase $\theta$ of Expression (5) may be obtained.

When Ta indicates a measurement sampling interval, the phase $\theta$ before frequency conversion which is obtained by the method as described above is computed using the following Expression (6), Expression (7), and Expression (8), and as a result, a frequency "f" may be obtained.

[Expression 6]

$$\frac{\Delta\theta}{\Delta T} = \omega = 2 \cdot \pi \cdot f \quad (6)$$

$\Delta T$ indicates a change in time and is equal to the computing interval (sampling rate).

Therefore, the phase ($\theta$) is expressed as follows.

[Expression 7]

$$\theta = 2\cdot\pi\cdot f\cdot Ta \quad (7)$$

where Ta: change in time (sampling interval) (sec.)
f: input frequency (Hz)
θ: change in phase (rad)

[Expression 8]

$$f = \frac{\theta}{2\cdot\pi\cdot T} \quad (8)$$

T: Sampling interval
f: Input fruquency
θ: Input phase

When such calculation is performed by the frequency measurement unit 120, high-speed frequency measurement may be achieved, (2) Quadrature Frequency Modulator In FIG. 5, the quadrature frequency modulators 110 and 130 have the same structure and each obtain a frequency difference between two input signals to output a frequency signal. Simultaneously, each of the quadrature frequency modulators generates and outputs a signal orthogonal to the frequency signal.

That is, the detection signal of the vibration velocity (outlet-side velocity signal) generated on the left side of the measurement tubes 2 and 3 vibrated by the vibrator 6 is detected by the left pick-off 7. The detection signal of the vibration velocity (outlet-side velocity signal) detected by the left pick-off 7 is input to the low-pass filter 30.

The analog signal of only the low-frequency left velocity signal (outlet-side velocity signal) is extracted by the low-pass filter 30 from the left velocity signal (outlet-side velocity signal) output from the left velocity sensor 7, converted into the digital signal by the A/D converter 31, and input to the quadrature frequency modulator 110.

In the quadrature frequency modulator 110, the frequency difference is obtained between the left velocity signal (outlet-side velocity signal) which is detected by the left velocity sensor 7, output from the A/D converter 31, and input to the quadrature frequency modulator 110, and the signal having the predetermined frequency signal output from the transmitter 140 based on the frequency measurement value output from the frequency measurement unit 120. Simultaneously, the signal orthogonal to the frequency signal is generated and output.

Further, the detection signal of the vibration velocity (inlet-side velocity signal) generated on the right side of the measurement tubes 2 and 3 when the measurement tubes 2 and are vibrated by the vibrator 6 is detected by the right pick-off 8. The detection signal of the vibration velocity (inlet-side velocity signal) detected by the right pick-off 8 is input to the low-pass filter 34.

The analog signal of only the low-frequency right velocity signal (inlet-side velocity signal) is extracted by the low-pass filter 34 from the right velocity signal (inlet-side velocity signal) output from the right velocity sensor 7, converted into the digital signal by the A/D converter 35, and input to the quadrature frequency modulator 130.

In the quadrature frequency modulator 130, the frequency difference is obtained between the right velocity signal (inlet-side velocity signal) which is detected by the right velocity sensor 8, output from the A/D converter 35, and input to the quadrature frequency modulator 130, and the predetermined frequency signal transmitted and output from the transmitter 140 based on the frequency measurement value output from the frequency measurement unit 120. Simultaneously, the signal orthogonal to the frequency signal is generated and output.

Assume that the output signal (left velocity signal LPO or right velocity signal RPO) from the vibration velocity sensor (left pick-off 7 or right pick-off 8) detecting the detection signal of the vibration velocity and the signal which is output from the transmitter 140 and input to the quadrature frequency modulator (more specifically, quadrature frequency modulator 110 or 130) are expressed as follows.

[Expression 9]

Vibration velocity sensor signal: $\sin(\theta)$

Transmitter output signal: $\cos(\theta_{Xn})$ \quad (9)

Therefore, in the quadrature frequency modulator 110 or 130, 90°-shift signals with respect to the output signal (left velocity signal LPO or right velocity signal RPO) from the vibration velocity sensor (left pick-off 7 or right pick-off 8) and the signal input from the transmitter 140 to the quadrature frequency modulator (more specifically, quadrature frequency modulator 110 or 130) are obtained from Expression 10 and Expression 11.

[Expression 10]

Sensor signal: $\sin(\theta)$

Sensor signal 90°-shift signal: $\cos(\theta)$ \quad (10)

[Expression 11]

Transmitter output signal: $\cos(\theta_{Xn})$

Transmitter 90°-shift signal: $\sin(\theta_{Xn})$ \quad (11)

Further, frequency differences, that is, (θ−θX) components are calculated based on signals obtained by frequency conversion on the respective signals of Expression (10) and Expression (11) and 90°-shift signals after the frequency conversion.

[Expression 12]

$$\sin\theta\cdot\cos\theta_{Xn} - \cos\theta\cdot\sin\theta_{Xn} = \sin(\theta-\theta_{Xn}) \quad (12)$$

[Expression 13]

$$\cos\theta\cdot\cos\theta_{Xn} - \sin\theta\cdot\sin\theta_{Xn} = \cos(\theta-\theta_{Xn}) \quad (13)$$

Therefore, in the frequency modulators 110 and 130, IQ signals of frequency differences between the input signals from the A/D converters 31 and 35 and the output signal from the transmitter 140 are generated and sent as respective quadrature modulation outputs.

(3) Transmitter

The transmitter 140 controls the frequency of the transmitter 140 based on the result θ obtained by measurement by the frequency measurement unit 120.

That is, in the transmitter 140, the transmitter 140 output $\cos\theta_x$, is determined such that the output frequency of the quadrature modulator 110 becomes 1/N of the frequency of the detection signal of the vibration velocity (outlet-side velocity signal) which is generated on the left side of the measurement tubes 2 and 3, and detected by the left pick-off 7, and input to the frequency modulator 110 in the case where the measurement tubes 2 and 3 are vibrated by the vibrator 6.

The frequency modulator 110 and the frequency modulator 130 have the same structure. Therefore, as in the case of the frequency output from the frequency modulator 110, with respect to the frequency output from the frequency modulator 130, the output frequency of the quadrature modulator 130 becomes 1/N of the frequency of the detection signal of the vibration velocity (inlet-side velocity signal) which is generated on the right side of the measurement tubes 2 and 3, and detected by the right pick-off 8, and input to the frequency modulator 130 in the case where the measurement tubes 2 and 3 are vibrated by the vibrator 6.

The frequency modulator 110 and the frequency modulator 130 each are provided to obtain the difference between the two frequencies input to each of the frequency modulators based on Expression (12) or (13) and to have the condition in which the output frequency becomes 1/N of the left velocity signal frequency or the right velocity signal frequency, and hence the following expression (Expression 14) is held.

[Expression 14]

$$\frac{\theta}{N} = \theta - \theta_X \quad (14)$$

$\theta$: Input signal
$\theta_X$: Transmitter output signal
N: Integer

As described above, the transmitter 140 output $\cos \theta_{Xn}$ is desirably determined to control $\theta_x$.

The output of each of the quadrature frequency modulators 110 and 130 becomes 1/N of the input signal. The results output from the quadrature frequency modulators 110 and 130 corresponding to the left pick-off 7 and the right pick-off 8, respectively, are expressed as follows.

[Expression 15]

$$\sin(\theta - \theta_x) = \sin\frac{\theta}{N} \quad (15)$$

$$\cos(\theta - \theta_x) = \cos\frac{\theta}{N}$$

[Expression 16]

$$\sin(\theta - \theta_x + \delta\phi) = \sin\left(\frac{\theta}{N} + \delta\phi\right) \quad (16)$$

$$\cos(\theta - \theta_x + \delta\phi) = \cos\left(\frac{\theta}{N} + \delta\phi\right)$$

The driving frequency of the left velocity sensor 7 and the driving frequency of the right velocity sensor 8 in the Coriolis flowmeter 1 are 1 kHz at maximum. Therefore, if the value of N is set to 32, the frequencies obtained by modulation by the quadrature frequency modulators 110 and 130 and output therefrom are approximately 30 Hz, and hence only a filter having a very low frequency and a narrow band is desirably prepared.

In Expression (15) and Expression (16), as described above, the N-value depends on a flowmeter type. Hereinafter, an example of the use of N is described below.

When the driving frequency of the sensors is set in a range of 50 Hz to 1,600 Hz and the filter frequency band of the converters is set to a range of 10 Hz to 40 Hz, the following table may be determined.

In the set conditions with respect to the N-value and the filter band, it is important to prevent the frequency after quadrature modulation from overlapping with the band of 50 Hz to 60 Hz (commercial frequencies).

| Driving frequency | N-value (frequency division value) | Frequency after quadrature modulation |
|---|---|---|
| 50 Hz-200 Hz | 5 | 10 Hz-40 Hz |
| 100 Hz-400 Hz | 10 | 10 Hz-40 Hz |
| 200 Hz-800 Hz | 20 | 10 Hz-40 Hz |
| 400 Hz-1,600 Hz | 40 | 10 Hz-40 Hz |

When the N-value is selected as described above, the filtering band used for phase measurement is held, and hence filtering may be performed without being affected by the driving frequency (input frequency).

The example of the use of the N-value is specifically described here, but needless to say, the actual use of the N-value depends on the set conditions such as the filter bands used for the adapted sensor and converter.

(4) Phase Measurement Unit

The results output from the quadrature frequency modulators are substituted for calculation into the following relational expression.

[Expression 17]

$$\tan(\alpha - \beta) = \frac{\sin\alpha \cdot \cos\beta - \cos\alpha \cdot \sin\beta}{\cos\alpha \cdot \cos\beta + \sin\alpha \cdot \sin\beta} \quad (17)$$

When the following expression is assumed,

[Expression 18]

[式 18]  (18)

$$\alpha = \frac{\theta}{N} + \delta\phi, \quad \beta = \frac{\theta}{N}$$

the following expression is obtained.

[Expression 19]

$$\tan\left(\frac{\theta}{N} + \delta\phi - \frac{\theta}{N}\right) = \frac{\sin\left(\frac{\theta}{N} + \delta\phi\right) \cdot \cos\left(\frac{\theta}{N}\right) - \cos\left(\frac{\theta}{N} + \delta\phi\right) \cdot \sin\left(\frac{\theta}{N}\right)}{\cos\left(\frac{\theta}{N} + \delta\phi\right) \cdot \cos\left(\frac{\theta}{N}\right) + \sin\left(\frac{\theta}{N} + \delta\phi\right) \cdot \sin\left(\frac{\theta}{N}\right)} \quad (19)$$

$$= \tan(\delta\phi)$$

Therefore, the phase difference may be obtained.

In another calculation method, the following expressions are used to calculate arc tangents.

[Expression 20]

$$\tan\frac{\theta}{N} = \frac{\sin\frac{\theta}{N}}{\cos\frac{\theta}{N}} \quad (20)$$

[Expression 21]

$$\tan\left(\frac{\theta}{N} + \delta\phi\right) = \frac{\sin\left(\frac{\theta}{N} + \delta\phi\right)}{\cos\left(\frac{\theta}{N} + \delta\phi\right)} \quad (21)$$

When a difference between the arc tangents is obtained, the phase difference may be calculated.

<<Feature of Phase measurement Method using Frequency Conversion>>

According to a feature of the phase measurement system in the present invention, the output signals (left velocity signal LPO and right velocity signal RPO) from the vibration velocity sensors (left pick-off 7 and right pick-off 8) may be sampled at the sampling interval unrelated to the frequency of the output signals (left velocity signal LPO and right velocity signal RPO) from the vibration velocity sensors (left pick-off 7 and right pick-off 8) detecting the detection signals of the vibration velocities which are input to the quadrature frequency modulators (more specifically, quadrature frequency modulators 110 and 130). Therefore, the structure may be very simple, the number of filter tables may be significantly reduced, and computation may be achieved with a small error.

There is little limitation on the phase measurement band by the input frequency. Therefore, coupling with sensors having various driving frequencies may be realized and there is an advantage that the system described above may be applied to various types. Further, the computing precision is not affected by the input frequency, and hence high-precision phase measurement may be always achieved.

Embodiment 3

The measurement tubes 2 and 3 including at least one flow tube or a pair of flow tubes, serving as measurement flow tubes, are operated by a driving device using the vibrator 6. The measurement tubes 2 and 3 including the at least one flow tube or the pair of flow tubes are alternately driven by the vibrator to vibrate the flow tubes.

In a Coriolis flowmeter, a phase difference and/or a vibration frequency proportional to a Coriolis force acting on the measurement tubes 2 and 3 including the at least one flow tube or the pair of flow tubes are/is detected by a pair of velocity sensors or a pair of acceleration sensors corresponding to vibration detection sensors including the left pick-off (LPO) 7 and the right pick-off (RPO) 8, which are provided on a right side and a left side of the flow tubes 2 and 3, to thereby obtain a mass flow rate and/or density of a fluid to be measured.

The Coriolis flowmeter includes the frequency measurement unit 120 for measuring a frequency based on an input signal frequency of a digital input signal (outlet-side velocity signal) digital converted by the A/D converter 31 and output from at least one sensor (for example, left pick-off 7), of two flow rate signals obtained by conversion, into digital signals, on two analog input signals of the phase difference and/or the vibration frequency proportional to the Coriolis force acting on the measurement tubes 2 and 3 including the pair of flow tubes, which are detected by the velocity sensors or the acceleration sensors.

Further, the transmitter 140 is provided to generate, transmit, and output a frequency signal of θ(1−1/N) of the digital frequency signal output from the frequency measurement unit 120.

Further, each of velocity sensor signals (for example, input signal (outlet-side velocity signal) input from left pick-off 7) from the pair of vibration detection sensors (left pick-off 7 and right pick-off 8) is converted into a digital signal by the two A/D converters 31 and 35. The pair of quadrature modulators 110 and 130 are provided for performing frequency quadrature modulation by performing addition (or subtraction) on the frequency of the input signal based on the frequency of the signal output from the transmitter 140.

The phase difference measurement section 150 is provided to measure the phase difference between the frequency of signals sin θ and sin(θ+δφ) obtained as the constant frequency signals by conversion by the pair of quadrature frequency modulators 110 and 130.

The signal processing apparatus 100 is provided to obtain the phase difference based on (i) a frequency, corresponding to 1/N of the frequency of the left velocity signal (outlet-side velocity signal) that is input from the A/D converter 31, of the signal which is output from the quadrature modulator 110 and (ii) a frequency, corresponding to 1/N of the frequency of the right velocity signal (inlet-side velocity signal) that is input from the A/D converter 35, of the signal which is output from the quadrature modulator 130 to thereby serve as the Coriolis flowmeter.

The invention claimed is:

1. A signal processing method for a Coriolis flowmeter in which at least one flow tube or a pair of flow tubes which is included in a measurement flow tube is operated by a driving device using a vibrator to drive the at least one flow tube or to alternatively the pair of flow tubes, and a phase difference and a vibration frequency proportional to a Coriolis force acting on the at least one flow tube or the pair of flow tubes is detected using a pair of vibration detection sensors when the at least one flow tube or the pair of flow tubes is vibrated, to thereby obtain a mass flow rate or density of a fluid to be measured, the signal processing method comprising:

performing frequency conversion of a first digital signal obtained by converting a first input signal from one of the pair of vibration detection sensors into the first digital signal, the frequency conversion performed on the first digital signal modulating the frequency of the first digital signal so that the frequency of the first digital signal after the frequency conversion is 1/Nth of the frequency of the first digital signal before the frequency conversion, where N is an integer greater than 1;

performing frequency conversion of a second digital signal obtained by converting a second input signal from the other one of the pair of vibration detection sensors into the second digital signal, the frequency conversion performed on the second digital signal modulating the frequency of the second digital signal so that the frequency of the second digital signal after the frequency conversion is 1/Nth of the frequency of the second digital signal before the frequency conversion; and measuring a phase difference between (i) the frequency converted first digital signal and (ii) the frequency converted second digital signal.

2. The signal processing method according to claim 1, wherein the signal processing method further comprises:
   measuring the frequency of the first digital signal before the frequency conversion; and
   generating a modulatable frequency signal based on the measured frequency of the first digital signal before the frequency conversion,
wherein the performing the frequency conversion of the first digital signal includes:

phase shifting the first digital signal before the frequency conversion by 90 degrees to generate a 90 degree phase shifted first digital signal before the frequency conversion;

phase shifting the modulatable frequency signal by 90 degrees to generate a first 90 degree phase shifted modulatable frequency signal; and subtracting, to obtain the first digital signal after the frequency conversion having the frequency that is 1/Nth the frequency of the first digital signal before the frequency conversion, (i) a product of the first digital signal before the frequency conversion and the first 90 degree phase shifted modulatable frequency signal from (ii) a product of the 90 degree phase shifted first digital signal before the frequency conversion and the modulatable frequency signal, wherein the performing the frequency conversion of the second digital signal includes:

phase shifting the second digital signal before the frequency conversion by 90 degrees to generate a 90 degree phase shifted second digital signal before the frequency conversion;

phase shifting the modulatable frequency signal by 90 degrees to generate a second 90 degree phase shifted modulatable frequency signal; and subtracting, to obtain the second digital signal after the frequency conversion having the frequency that is 1/Nth the frequency of the second digital signal before the frequency conversion, (i) a product of the second digital signal before the frequency conversion and the second 90 degree phase shifted modulatable frequency signal from (ii) a product of the 90 degree phase shifted second digital signal before the frequency conversion and the modulatable frequency signal, and wherein the modulatable frequency signal is generated based on the measured frequency of the first digital signal before the frequency conversion so that the frequency of the first digital signal after the frequency conversion is 1/Nth the frequency of the first digital signal before the frequency conversion.

3. The signal processing method according to claim 2, wherein the modulatable frequency signal is generated based on the measured frequency of the first digital signal before the frequency conversion so that N is determined such that the frequency of the first digital signal after the frequency conversion is smaller than 50 Hz.

4. A signal processing apparatus for a Coriolis flowmeter in which at least one flow tube or a pair of flow tubes which is included in a measurement flow tube is operated by a driving device using a vibrator to drive the at least one flow tube or to alternatively drive the pair of flow tubes, and a phase difference or a vibration frequency proportional to a Coriolis force acting on the at least one flow tube or the pair of flow tubes is detected using a pair of vibration detection sensors when the at least one flow tube or the pair of flow tubes is vibrated, to thereby obtain a mass flow rate or density of a fluid to be measured, the signal processing apparatus comprising:

a first frequency modulator for performing frequency conversion of a first digital signal obtained by converting a first input signal from one of the pair of vibration detection sensors into the first digital signal, the first frequency modulator performing the frequency conversion of the first digital signal by modulating the frequency of the first digital signal so that the frequency of the first digital signal after the frequency conversion is 1/Nth of the frequency of the first digital signal before the frequency conversion, where N is an integer greater than 1;

a second frequency modulator for performing frequency conversion of a second digital signal obtained by converting a second input signal from the other one of the pair of vibration detection sensors into the second digital signal, the second frequency modulator performing the frequency conversion of the second digital signal by modulating the frequency of the second digital signal so that the frequency of the second digital signal after the frequency conversion is 1/Nth of the frequency of the second digital signal before the frequency conversion; and a frequency measurement unit for measuring a phase difference between (i) the frequency converted first digital signal and (ii) the frequency converted second digital signal.

5. The signal processing apparatus according to claim 4, wherein the signal processing apparatus further comprises:

a frequency measurement unit for measuring the frequency of the first digital signal before the frequency conversion; and a transmitter for generating a modulatable frequency signal based on the measured frequency of the first digital signal before the frequency conversion, wherein the first frequency modulator:

(i) phase shifts the first digital signal before the frequency conversion by 90 degrees to generate a 90 degree phase shifted first digital signal before the frequency conversion;

(ii) phase shifts the modulatable frequency signal by 90 degrees to generate a first 90 degree phase shifted modulatable frequency signal;

(iii) subtracts, to obtain the first digital signal after the frequency conversion having the frequency that is 1/Nth the frequency of the first digital signal before the frequency conversion, (i) a product of the first digital signal before the frequency conversion and the first 90 degree phase shifted modulatable frequency signal from (ii) a product of the 90 degree phase shifted first digital signal before the frequency conversion and the modulatable frequency signal, wherein the second frequency modulator:

(i) phase shifts the second digital signal before the frequency conversion by 90 degrees to generate a 90 degree phase shifted second digital signal before the frequency conversion;

(ii) phase shifts the modulatable frequency signal by 90 degrees to generate a second 90 degree phase shifted modulatable frequency signal;

(iii) subtracts, to obtain the second digital signal after the frequency conversion having the frequency that is 1/Nth the frequency of the first digital signal before the frequency conversion, (i) a product of the second digital signal before the frequency conversion and the second 90 degree phase shifted modulatable frequency signal from (ii) a product of the 90 degree phase shifted second digital signal before the frequency conversion and the modulatable frequency signal, and wherein the transmitter generates the modulatable frequency signal based on the measured frequency of the first digital signal before the frequency conversion so that the frequency of the first digital signal after the frequency conversion is 1/Nth the frequency of the first digital signal before the frequency conversion.

6. A Coriolis flowmeter in which at least one flow tube or a pair of flow tubes which is included in a measurement flow tube is operated by a driving device using a vibrator to drive the at least one flow tube or to alternatively drive the pair of flow tubes, and a phase difference or a vibration frequency proportional to a Coriolis force acting on the at least one flow tube or the pair of flow tubes is detected using a pair of vibration detection sensors when the at least one flow tube or the pair of flow tubes is vibrated, to thereby obtain a mass flow rate or density of a fluid to be measured, the Coriolis flowmeter comprising a signal processing apparatus, the signal processing apparatus including:

a first frequency modulator for performing frequency conversion of a first digital signal obtained by converting a first input signal from one of the pair of vibration detection sensors into the first digital signal, the first frequency modulator performing the frequency conversion of the first digital signal by modulating the frequency of the first digital signal so that the frequency of the first digital signal after the frequency conversion is 1/Nth of the frequency of the first digital signal before the frequency conversion, where N is an integer greater than 1;

a second frequency modulator for performing frequency conversion of a second digital signal obtained by converting a second input signal from the other one of the pair of vibration detection sensors into the second digital signal, the second frequency modulator performing the frequency conversion of the second digital signal by modulating the frequency of the second digital signal so that the frequency of the second digital signal after the frequency conversion is 1/Nth of the frequency of the second digital signal before the frequency conversion; and a frequency measurement unit for measuring a phase difference between (i) the frequency converted first digital signal and (ii) the frequency converted second digital signal.

* * * * *